United States Patent
Amuru et al.

(10) Patent No.: US 11,324,037 B2
(45) Date of Patent: May 3, 2022

(54) APPARATUS AND METHOD FOR MANAGING RANDOM ACCESS CHANNEL CONFIGURATION IN WIRELESS COMMUNICATION SYSTEM

(71) Applicant: Samsung Electronics Co., Ltd, Suwon-si (KR)

(72) Inventors: Saidhiraj Amuru, Karnataka (IN); Hyunil Yoo, Suwon-si (KR); Anshuman Nigam, Karnataka (IN); Ji-Yun Seol, Seongnam-si (KR); Taeyoung Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 80 days.

(21) Appl. No.: 16/747,405

(22) Filed: Jan. 20, 2020

(65) Prior Publication Data

US 2020/0187246 A1    Jun. 11, 2020

Related U.S. Application Data

(63) Continuation of application No. 15/971,602, filed on May 4, 2018, now Pat. No. 10,542,562.

(30) Foreign Application Priority Data

May 5, 2017 (IN) .............................. 201741015918
Jun. 13, 2017 (IN) .............................. 201741020561
(Continued)

(51) Int. Cl.
*H04W 74/00* (2009.01)
*H04L 5/00* (2006.01)
(Continued)

(52) U.S. Cl.
CPC ....... *H04W 74/006* (2013.01); *H04J 11/0073* (2013.01); *H04J 11/0076* (2013.01);
(Continued)

(58) Field of Classification Search
CPC ..... H04L 5/0023; H04L 5/005; H04L 5/0053; H04L 5/0091; H04W 74/006;
(Continued)

(56) References Cited

U.S. PATENT DOCUMENTS

2008/0214193 A1    9/2008   Jeong et al.
2013/0028186 A1    1/2013   Kim
(Continued)

FOREIGN PATENT DOCUMENTS

EP    2129147 A1    12/2009

OTHER PUBLICATIONS

NTT Docomo Discussion on 4-step random access procedure for NR 3gPP R1-1705712 Jul. 4, 2017 (Year: 2017).*
(Continued)

*Primary Examiner* — Rina C Pancholi

(57) ABSTRACT

The present disclosure is related to a $5^{th}$ generation (5G) or pre-5G communication system for supporting a higher data rate than a $4^{th}$ generation (4G) communication system such as long term evolution (LTE). According to various embodiments of the present disclosure, a method for operating a base station in a wireless communication system is provided. The method comprises: generating remaining minimum system information (RMSI) comprising random access channel (RACH) configuration, wherein the RACH configuration comprises an association between RACH resources and one of a synchronization signal (SS) block and channel state information reference signal (CSI-RS) resources; and transmitting, to a user equipment (UE), the RMSI.

16 Claims, 19 Drawing Sheets

(30) Foreign Application Priority Data

Sep. 12, 2017 (IN) .............................. 201741032169
Apr. 25, 2018 (IN) .............................. 201741015918

(51) Int. Cl.
  *H04W 48/12* (2009.01)
  *H04J 11/00* (2006.01)
  *H04W 74/08* (2009.01)

(52) U.S. Cl.
  CPC ........ *H04J 11/0079* (2013.01); *H04L 5/0053* (2013.01); *H04W 48/12* (2013.01); *H04L 5/005* (2013.01); *H04L 5/0023* (2013.01); *H04L 5/0091* (2013.01); *H04W 74/0833* (2013.01)

(58) Field of Classification Search
  CPC ............... H04W 48/10; H04W 74/0833; H04J 11/0073; H04J 11/0076; H04J 11/0079
  See application file for complete search history.

(56) References Cited

U.S. PATENT DOCUMENTS

| | | | |
|---|---|---|---|
| 2016/0198497 | A1 | 7/2016 | Yu et al. |
| 2017/0135001 | A1 | 5/2017 | Kim et al. |
| 2018/0110019 | A1 | 4/2018 | Ly et al. |
| 2019/0007152 | A1* | 1/2019 | Yi ...................... H04L 5/0028 |
| 2019/0159265 | A1* | 5/2019 | Takeda ................ H04W 28/06 |
| 2019/0230696 | A1* | 7/2019 | Kim ..................... H04L 5/0053 |

OTHER PUBLICATIONS

U.S. Appl. No. 62/357,945 Kim et al. filed Jul. 2, 2016 (Year: 2016).*
U.S. Appl. No. 62/418,179 Kim et al. filed Nov. 6, 2016 (Year: 2016).*
U.S. Appl. No. 62/491,274 Kim et al. filed Apr. 28, 2017 (Year: 2017).*
U.S. Appl. No. 62/403,034 Yi et al. filed Sep. 30, 2016 (Year: 2016).*
International Search Reported dated Aug. 17, 2018 in connection with International Patent Application No. PCT/KR2018/005156.
Written Opinion of the International Searching Authority dated Aug. 17, 2018 in connection with International Patent Application No. PCT/KR2018/005156.
"3rd Generation Partnership Project; Technical Specification Group Radio Access Network; Study on New Radio (NR) access technology (Release 14)", 3GPP TR 38.912 v14.0.0, Mar. 2017, 74 pages.
Samsung et al., "WF on CSI-RS based RACH Configuration", 3GPP TSG RAN WG1 Meeting #NR Adhoc2, Jun. 27-30, 2017, 2 pages, R1-1711936.
Huawei et al., "WF on RACH configuration in RMSI", 3GPP TSG RAN WG1 NR Ad-Hoc meeting, Jun. 27-30, 2017, 3 pages, R1-1711866.
Huawei et al., "WF on numerology for RMSI", 3GPP TSG-RAN WG1 #89, May 15-19, 2017, 3 pages, R1-17xxxxx.
Supplementary European Search Report in connection with European Application No. 18794419.4 dated Mar. 31, 2020, 10 pages.
Fujitsu, "Discussion on RACH procedure," R1-1704477, 3GPP TSG RAN WG1 Meeting #88bis, Spokane, USA, Apr. 3-7, 2017, 6 pages.
Nokia, et al., "RACH in Multibeam System," R2-1703553, 3GPP TSG-RAN WG2 Meeting #97bis, Spokane, USA, Apr. 3-7, 2017, 5 pages.
NTT Docomo, Inc., "Discussion on 4-step random access procedure for NR," R1-1705712, 3GPP TSG RAN WG1 Meeting #88bis, Spokane, USA, Apr. 3-7, 2017, 8 pages.
Samsung, "NR 4-step random access procedure," R1-1700891, 3GPP TSG RAN WG1 NR Ad Hoc, Spokane, Washington, USA, Jan. 16-20, 2017, 14 pages.

* cited by examiner

| SS block 1 | SS block 2 | SS block 3 | SS block 4 | SS block 5 | SS block 6 | SS block 7 | SS block 8 | SS block 9 |
|---|---|---|---|---|---|---|---|---|
| 1 | 12 | 19 | 34 | 25 | 27 | 12 | 14 | 34 |

FIG.8

APPARATUS AND METHOD FOR MANAGING RANDOM ACCESS CHANNEL CONFIGURATION IN WIRELESS COMMUNICATION SYSTEM

CROSS-REFERENCE TO RELATED APPLICATIONS

This application is a continuation of U.S. patent application Ser. No. 15/971,602 filed on May 4, 2018, which is based on and claims priority under 35 U.S.C. § 119 to Indian Patent Application Nos. 201741015918 filed on May 5, 2017; 201741020561 filed on Jun. 13, 2017; 201741032169 filed on Sep. 12, 2017; and 201741015918 filed on Apr. 25, 2018, in the India Intellectual Property Office, the disclosures of which are herein incorporated by reference in their entirety.

BACKGROUND

The present disclosure relates to a wireless communication system and more particularly to a method and system for managing a random access channel (RACH) configuration in the wireless communication system.

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a "beyond 4G network" or a "post long term evolution (LTE) system."

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

For the 5G communication systems, above 6 GHz bands is a potential spectrum for the data communication services and the voice communication services. In such bands, it has been shown that a beamforming is necessary for a successful communication to be performed. In such cases, a random access procedure is performed for providing a communication between a user equipment (UE) and a base station.

The principal object of the embodiments herein is to provide a method and system for managing a RACH configuration in a wireless communication system.

SUMMARY

According to various embodiments of the present disclosure, a method for operating a base station in a wireless communication system is provided. The method comprises: generating remaining minimum system information (RMSI) comprising random access channel (RACH) configuration, wherein the RACH configuration comprises an association between RACH resources and one of a synchronization signal (SS) block and channel state information reference signal (CSI-RS) resources; and transmitting, to a user equipment (UE), the RMSI.

According to various embodiments of the present disclosure, a method for operating a user equipment (UE) in a wireless communication system is provided. The method comprises: receiving, from a base station, remaining minimum system information (RMSI) comprising random access channel (RACH) configuration, wherein the RACH configuration comprises an association between RACH resources and one of a SS block and channel state information reference signal (CSI-RS) resources; and performing a random access procedure based on the association.

According to various embodiments of the present disclosure, a user equipment (UE) in a wireless communication system is provided. The apparatus comprises: a transceiver; and at least one processor coupled to the transceiver, and configured to: receive, from a base station, a remaining minimum system information (RMSI) comprising random access channel (RACH) configuration, wherein the RACH configuration comprises an association between RACH resources and one of a SS block and channel state information reference signal (CSI-RS) resources; and perform a random access procedure based on the association.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 8 illustrates an example scenario of a random association between the SS blocks and the RACH resources according to an embodiment as disclosed herein;

DETAILED DESCRIPTION

Figure 1:
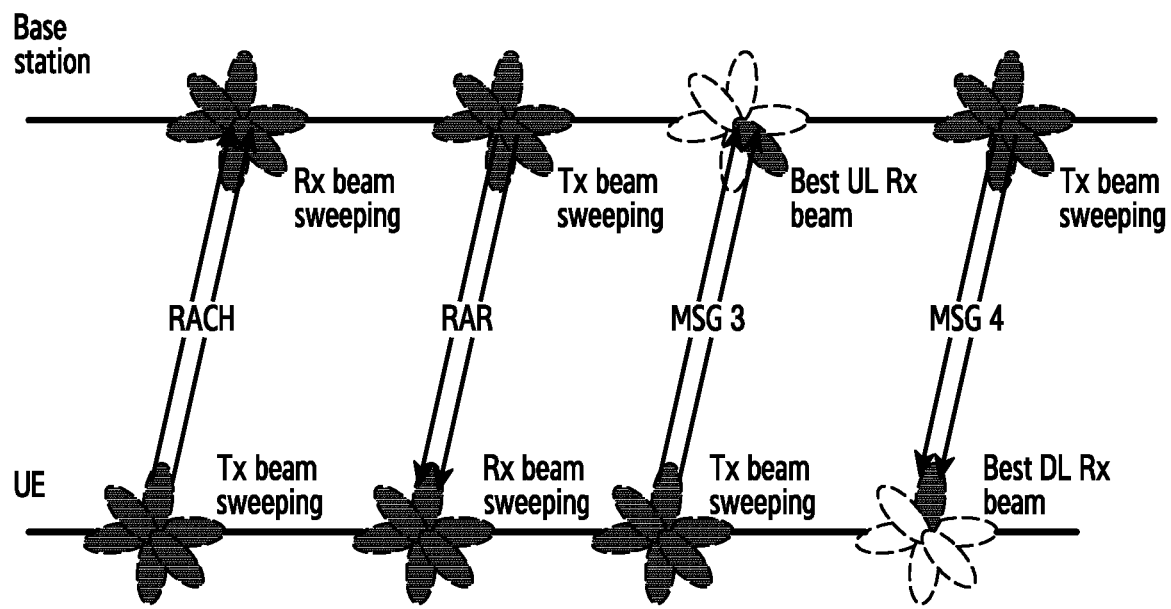
FIG. 1 illustrates an example RACH procedure for beamforming in 5G communication system according to a prior art.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments. Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, engines, controllers, units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Hereinafter, in various embodiments of the present disclosure, hardware approaches will be described as an example. However, various embodiments of the present disclosure include a technology that uses both hardware and software and thus, the various embodiments of the present disclosure may not exclude the perspective of software.

The terms referring to a signal, the terms referring to a channel, the terms referring to control information, the terms referring to a network entity, and the terms referring to elements of a device used in the following description are used only for convenience of the description. Accordingly, the present disclosure is not limited to the following terms, and other terms having the same technical meaning may be used.

Further, although the present disclosure describes various embodiments based on the terms used in some communication standards (for example, 3rd generation partnership project (3GPP)), the communication standards are only examples for the description. Various embodiments of the present disclosure may be easily modified and applied to other communication systems.

The term "NR" is "new radio" is the term used by 3GPP specification for discussing activities about 5G communication systems.

The term "base station" and "gNB" used herein can be used interchangeably without departing from the scope of the embodiments. Further, the term "mapping" and "association" used herein can be used interchangeably without departing from the scope of the embodiments. The term "Msg1" and "RACH message 1" used herein can be used interchangeably without departing from the scope of the embodiments. The term "Msg2" and "RACH message 2" used herein can be used interchangeably without departing from the scope of the embodiments. The term "Msg3" and "RACH message 3" used herein can be used interchangeably without departing from the scope of the embodiments. The term "Msg4" and "RACH message 4" used herein can be used interchangeably without departing from the scope of the embodiments.

Generally, mobile communication systems have been developed for providing a high quality mobile communication services to a user. With the dramatic development of communication technologies, the mobile communication systems are now capable of providing high-speed data communication services as well as voice communication services. A long term evolution (LTE) is a technology for implementing a packet-based communication at a higher data rate of a maximum of about 100 Mbps. In order to meet the demand for increased wireless data traffic, since deployment of 4th generation (4G) communication systems, efforts have been made to develop an improved 5th generation (5G) communication systems or a LTE-Advanced communication system. Therefore, the 5G or LTE-Advanced communication system is also called a "beyond 4G network" or a "post LTE system." The 4G communication systems operate in sub-6 GHz spectrum bands, where all transmissions and receptions take place in an omni-directional manner. The 5G communication system is considered to be implemented in higher frequency (mm Wave) bands as well, for e.g., 28 GHz, 60 GHz, etc., so as to accomplish higher data rates.

For the 5G communication systems, above 6 GHz bands is a potential spectrum for the data communication services and the voice communication services. In such bands, it has been shown that a beamforming is necessary for a successful communication to be performed. In such cases, a random access procedure is performed for providing a communication between a user equipment (UE) and a base station.

The random access procedure is a most essential procedure performed by the UE to get access to a network (eNodeB) after a downlink synchronization is performed. Without this random access procedure, the UE cannot get the timing alignment for uplink transmissions of the UE, without the timing alignment the UL cannot be decoded by the eNodeB. Furthermore, as the user moves from one location to another location, the UE of the user keeps performing a handover from one base station to another base station. In such cases, inter-cell measurement procedures may change for beamforming which may thereby need to be accounted for the successful random access procedure.

In LTE system, the UE performs an initial access procedure by scanning a primary synchronization signal (PSS), and a secondary synchronization signal (SSS) and then synchronizes with the downlink. After synchronization, the random access procedures are performed by the UE, in order to acquire an uplink synchronization to send uplink transmissions appropriately. While this is generally a contention-based procedure, where the UE has to contend with several other users in order to successfully be heard by the base station. Further, there is another procedure for the random access known as contention-free random access procedure in which the UE may be provided with dedicated resources for sending a random access preamble to the base station for the uplink synchronization. In such scenario, the contention-free random access procedure is more applicable during an inter-base station handover. In such case, the UE needs to get the uplink synchronization with a target base station when performing handover from a source base station to the target base station, for obtaining a seamless connection. For this, dedicated resources (which could be time/frequency/code domain resources) are allocated by the target base station to the UE over which the UE sends the random access preamble. This minimizes the latency involved in the contention-free random access procedure.

FIG. 1 illustrates an example beamforming based random access channel (RACH) procedure in the 5G communication system. The RACH procedure is performed after a downlink (DL) synchronization phase. The UE performs the RACH procedure with a transmission reception point (TRP) inside a cell area which is under control of one 5G communication system or with a gNB itself. Since, best beams are unknown during an initial access RACH procedure, beam sweeping based mechanisms are necessary during the initial access RACH procedures. However, performing this procedure during handover from the source base station (gNB) to the target base station (gNB) may be slow. Hence, an additional mechanism for improving the same is needed. However, this mechanism depends on how inter gNB measurements are performed.

For the UE which is connected to a source gNB, the UE has a best beam pair. After receiving a handover request from the source gNB, the UE has to perform measurements for a neighboring cell. Since the best beams are unknown in this case, the UE has to scan all possible directions to find inter cell measurements. The inter-cell measurement used for 5G are as described herein:

synchronization signal (SS block) based; and channel state information reference signal (CSI-RS) based.

In the SS block based method, all ports of the target gNB send a same SS signal at the same time in a correlated direction. For example, all beams neighboring to each other may form a correlated beam. In this manner, while beams from each port are narrow, the overall effect of sending the same SS signal along the correlated direction creates a wider beam. Unlike to the option (a), the option (b) relies only on the narrow beams formed using the CSI-RS. In other words, all ports of the target gNB send the SS signal and the CSI-RS in different directions at a given time instant. In such a scenario, the UE can see only one beam at a particular direction.

The multi stage contention-based beamforming based random access procedures have been addressed for 5G communication systems. However the contention-free random access procedures needed for handovers and timing alignment adjustments in the 5G communication systems are yet to be addressed.

Thus, it is desired to address the above mentioned disadvantages or other shortcomings or at least provide a useful alternative.

The principal object of the embodiments herein is to provide a method and system for managing a RACH configuration in a wireless communication system.

Another object of the embodiments herein is to configure by a base station remaining minimum system information (RMSI) information include the RACH configuration, where the RACH configuration includes an association between RACH resources and one of a SS block and a CSI-RS resource.

Another object of the embodiments herein is to configure the RACH configuration common across all SS blocks.

Another object of the embodiments herein is to configure a part of RACH configuration common across all SS blocks.

Another object of the embodiments herein is to configure a different RACH configuration across different SS blocks.

Another object of the embodiments herein is to broadcast a complete RACH configuration in all SS blocks used for the RMSI within a cell.

Another object of the embodiments herein is to indicate by the base station the RMSI to a UE.

Another object of the embodiments herein is to indicate a plurality of bits for the RACH configuration in the RMSI using at least one of the RMSI, a physical downlink control channel (PDCCH) RMSI and a physical broadcast channel (PBCH) to the UE.

Another object of the embodiments herein is to indicate a location of the plurality of bits for the RACH configuration in RMSI physical downlink shared channel (PDSCH) using the PDCCH RMSI to the UE.

Another object of the embodiments herein is to perform by the UE a random access procedure based on the association.

Another object of the embodiments herein is to decode the plurality of bits for the RACH configuration in the RMSI using at least one of the RMSI, the PDCCH RMSI and the physical broadcast channel (PBCH) from the base station.

Another object of the embodiments herein is to decode the RACH configuration in the RMSI from a most significant bit (MSB) of the plurality of bits or from a least significant bit (LSB) of the plurality of bits.

Another object of the embodiments herein is to configure by the base station the association between RACH resources and a multiple SS blocks and multiple CSI-RS resources.

Another object of the embodiments herein is to indicate by the base station the association for a handover RACH to the UE.

Another object of the embodiments herein is to perform by the UE the random access procedure for the handover RACH based on the association.

Another object of the embodiments herein is to indicate a numerology for at least one of a RACH message 1, a RACH message 2, a RACH message 3, and a RACH message 4 in the RACH configuration in the RMSI.

Embodiments herein provide a method of managing a RACH configuration in a wireless communication system. The method includes configuring by a base station RMSI information include the RACH configuration, where the RACH configuration includes an association between RACH resources and one of a SS block and a CSI-RS resource. Further, the method includes indicating by the base station the RMSI to a UE.

Embodiments herein provide a method of managing a RACH configuration in a wireless communication system. The method includes configuring by a base station an association between the RACH resources and at least one of multiple SS blocks and multiple CSI-RS resources. Further the method includes indicating by the base station the association for a handover RACH to a UE.

Unlike conventional methods and systems, the provided method can be used for random access procedures and configurations for beamforming-based connected mode handovers. The provided method allows the UE to receive the RACH configuration in the RMSI. Further, the provided method can be used to configure the RMSI in a beam-common manner, thus the UE need not decode the RMSI upon a beam change, which results in saving power effectively. Further, the provided method can be used to indicate the plurality of bits used for the RACH configuration to the UE. The provided method provides a re-transmission of a random access preamble which is necessary for successful random access procedures.

The provided method allows the base station to associate the RACH resources and one of the SS block and the channel state information reference signal (CSI-RS) resources based on an explicit mapping and/or an equation based mapping for an initial-access RACH.

The provided method allows the base station to associate the RACH resources and the at least one of the multiple SS blocks and the multiple CSI-RS resources based on a QCL relationship between CSI-RS resource and the SS block resources, for a contention-free RACH.

The provided method herein is applicable for any future wireless technologies that can be built upon beamforming based systems. It may be noted that irrespective of the exact signals used i.e., SS block and CSI-RS, the embodiments in the provided method and system are applicable for all cases where wide beams and/or narrow beams are used.

Referring now to the drawings, and more particularly to FIGS. 2 through 17, there are shown preferred embodiments.

FIG. 1 illustrates an example RACH procedure for beamforming in 5G communication system according to a prior art.

As shown in the FIG. 1, the RACH procedure performed herein is after a downlink (DL) synchronization phase. The various RACH aspects and configurations for the 5G and future wireless systems (beyond 5G) are described herein. For Msg1 (such as preamble) re-transmission, it may be supported on a slot basis and not a sub-frame basis as done in LTE systems. Furthermore, if a random access response (RAR) is received in a slot-n, and a corresponding PDSCH does not contain a response to the preamble sent by the UE, the UE can, if requested by higher layers, be configured to transmit a new preamble during one of next RACH slots. This is different from the LTE five sub-frame delay and is necessary because the UE may be capable of sending Msg1 on some other SS block as soon as the UE finds the Msg 1 on some other SS block. Similarly, if there is no RAR obtained in the slot-n (configured as per RAR timeline) for the Msg1 sent by the UE, where the slot-n is the last slot of a RAR window (if the RAR window is configured in terms of the symbols, then n can be considered in symbol granularity), the UE can be, if requested by higher layers, be configured to transmit a new Msg1 during one of the next RACH slots and is different from the four sub frame delay configured in the LTE system. For example, the re-transmission can start in the next slot/symbol if the UE finds a suitable SS block and can use the RACH resource for Msg1.

RACH for carrier aggregation (CA) and dual connectivity: In the LTE system, a random access procedure can be performed on a primary cell (P-Cell) as well as a secondary Cell (S-Cell). In case of the S-Cell (other than the PS-Cell), only a contention free random access procedure (such as RAR handover RACH) is performed. The random access procedure for the S-Cell (other than the PS-Cell) is only initiated by the base station via a PDCCH order. The PDCCH order can be received on the same S-Cell (non-cross carrier scheduling) or on a scheduling cell (cross carrier scheduling). This procedure helps in establishing a timing advance (TA) for a secondary timing advance group (s TAG).

When performing the random access procedure on the P-Cell while the CA is configured, the UE transmits the RACH preamble (i.e., Msg1) on the P-Cell and receives the corresponding RAR on the P-Cell. When performing the contention free random access procedure on the S-Cell while CA is configured, the UE transmits the RACH preamble on the S-Cell and receives the corresponding RAR on the P-Cell. In the CA, only one RA procedure is ongoing at any time instant and helps to reduce an additional blind decoding on the S-Cell. For a primary timing advance group (pTAG), the UE can be configured to use the P-Cell as a timing reference. The TAG containing P-Cell is the pTAG. When the S-Cell is deactivated, the ongoing random access procedure on the S-Cell, if any, is cancelled. As compared to the RA procedure on P-Cell, the UE, after transmitting a PRACH preamble for maximum number times on the S-Cell, cannot indicate a RA problem to upper layers and instead just considers that the RACH procedure was unsuccessful. The timing alignment value may be used for the PUCCH/PUSCH and a sounding reference signal (SRS) on the P-cell/PS-Cell and for PUSCH/SRS on the S-Cell.

Further, when performing the random access procedure on the P-Cell or PS-Cell while dual connectivity (DC) is configured, the UE transmits the RACH preamble and receives the RAR on corresponding cell. This is to ensure that an unnecessary latency between a master eNB (MeNB) and a secondary eNB (SeNB) can be avoided due to backhaul issues. Hence, there is a merit for support of parallel RA procedures. When performing the contention free random access procedure on the S-Cell (other than PS-Cell) while DC is configured, the UE transmits the RACH preamble on the S-Cell and receives the corresponding RAR on the P-Cell for a MeNB primary cell group (MCG) and the PS-Cell for Secondary cell group (SCG). Similar to the CA, this procedure helps to reduce the number of blind decodes by avoiding blind decoding for RACH on the S-Cell.

Since the CA and the DC are supported in new radio (NR), the above principles in NR as baseline (irrespective of LTE-NR or NR-NR dual connectivity). The above mechanisms for the S-Cell can help to avoid control-resource set (CORESET) configurations for the purpose of RACH. Furthermore, it is considered that based on the configurations above, and before the RACH procedure can be initiated, the following information for related cell is assumed to be available: set of RACH transmission occasions, set of random access preambles, a power ramping factor, maximum number of repetitions, and the RAR window start and so on.

Numerology impacts of S-cell: the S-Cell may use a different numerology as compared to the P-Cell or PS-Cell in NR. In such a case, when the RAR is received on the P-Cell/PS-Cell for the contention-free RA initiated by the PDCCH order and contains an initial UL grant for the handover case (for example), the allocation may be assigned based on the numerology of the S-cell. This may impact the RAR formats depending on the numerology used on the S-Cell as the UL grants may depend on the RB sizes which in turn depend on the numerology used. The numerology may be indicated in RAR, or default numerology is assumed for the S-cell and then used in the RAR and appropriate a RBG scaling may be used. The default numerology for S-cell could be fixed in specification or could be tied up to the synchronization signals received in that S-cell or functions of the synchronization signals or PBCH or RMSI sent in that S-cell which a user first needs for synchronization.

Calculation of TA Values based on numerology: In the case of LTE, there is only one numerology and all TA calculations were done in terms of a sample time (Ts) which is fixed to (1/30720) ms. Hence, there is no ambiguity in the formation of the TAG which takes into account the TA values calculated above. However, in the case of NR, it is possible to support multiple numerologies within and across carriers. Hence, the value of Ts can change based on the numerology. In such cases, the TA values indicated via RAR may be carefully signaled to the user and the TAG when it is formed may be based on the absolute TA values and not the values in terms of Ts that is dependent on the numerology. Or else, some reference numerology need to be configured to define the TA values calculation and then everything may be calculated just for TA sake based on these. Further, having the TAG per numerology may be avoided as it may un-necessarily increase the number of TAGs and the TAG Id field size. However, if it eases the procedure, the TAG per numerology can be used and some signaling based on each such group can be used. The TAG per numerology for instance depends on the UE capability as well.

For the case of synchronized deployments for DC, power limitations for parallel RA procedures can be followed similar to the LTE. In case of non-synchronized deployments, the power limitations for the parallel RA procedures can be calculated based on some priority rules determined based on a network configuration, for instance based on the type of data type such as ultra-reliable low latency communications (URLLC) can be given higher priority irrespective of the P-Cell or the S-Cell. For the LTE, in both synchronized and non-synchronized DC, the UE is configured with a minimum power for each cell group, as a percentage of the maximum UE output power Pcmax. Once the minimum power is given to each group, then a remaining power can be shared based on priority levels as configured by the network or based on which cell group is starting transmissions earlier. Further, the same concept is applicable for the PRACH. And the same concept is used for LTE-NR dual connectivity and PRACH transmissions.

However, the NR supports multiple numerologies such as 1.25 kHz, 5 kHz ... 480 kHz and others. And the LTE uses only 1.25 KHz. Then there is some difference in power calculations based on sub carrier spacing that is used for power calculations in a dual connectivity mode. In this scenario, the transmission with a smaller SCS would restrict the UL power sharing assuming that the transmission power is maintained during transmission of higher SCS.

Further, when the NR is using CP-OFDM for RACH but the LTE is using DFT-s-OFDM for PRACH, then there is the difference in power calculations. Then power sharing is based on the waveform may be accounted for CP-OFDM has high PAPR than DFT-s-OFDM. Other waveforms may also be used for NR such as pi/2 BPSK. Then based on waveform, each of them can have separate back off values. Then accordingly, the UE may be instructed for power levels based on waveform for simultaneous RACH. For example, the following formula is given in equation (1), $$PPRACH = \min\{P_{CMAX,c}, PREAMBLE\_RECEIVED\_TARGET\_POWER + PLc\} \quad (1)$$

where the PREAMBLE_RECEIVED_TARGET_POWER=preamble initial received target power+DELTA_PREAMBLE+(PREAMBLE_TRANSMISSION_COUNTER−1)*power ramping step The preamble initial received target power or DELTA_PREAMBLE or power Ramping Step or Pcmax, can be changed based on waveform(s) being used simultaneously. This can be configured by the higher layers. These values can be for example 3 dB difference between CP-OFDM and DFT-s-OFDM to account for the back off levels. Further, the LTE uses DFT-s-OFDM but NR can use CP-OFDM or DFT-s-OFDM or pi/2 BPSK with spectrum shaping or other waveforms etc. Even inside DFT-s-OFDM depending on clustered or non-clustered transmission, the power levels may be changed. The gap between single and multi-clustered DFT-s-OFDM could be ~1 dB in terms of back-off levels. For NR-NR dual connectivity, a numerology, a waveform, beamforming impacts, a beam width, and other related parameters can all be considered to impact these terms in the power calculations.

Figure 2:
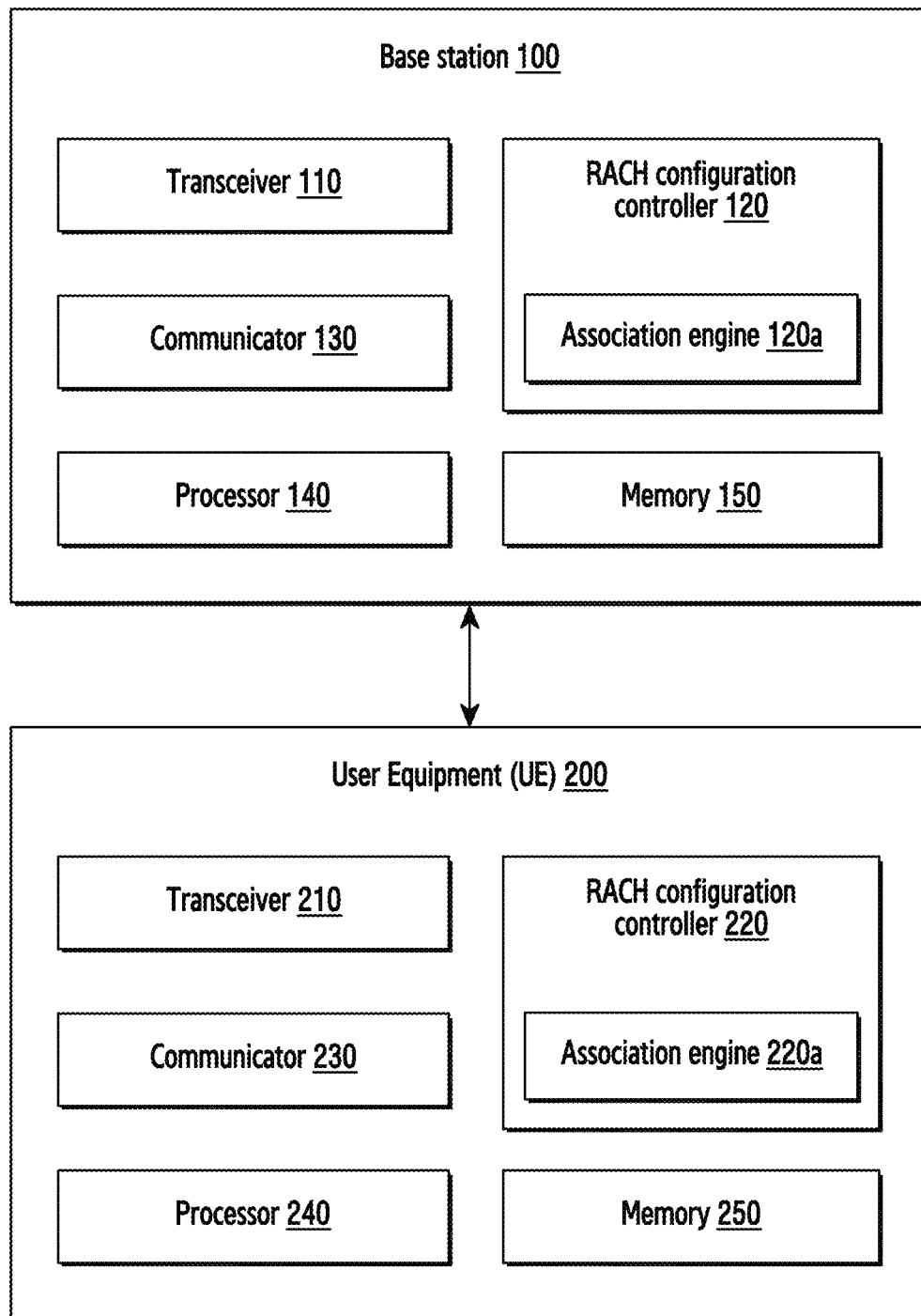
FIG. 2 illustrates a block diagram of a wireless communication system in which a base station communicates with a UE according to an embodiment as disclosed herein.

FIG. 2 illustrates a block diagram of a wireless communication system in which a base station 100 communicates with a UE 200 according to an embodiment as disclosed herein. In one embodiment, the base station 100 includes a transceiver 110, a RACH configuration controller 120 includes an association engine 120a, a communicator 130, a processor 140, and a memory 150. The base station 100 can be for example but not limited to a next generation NodeB (gNB), evolved NodeB (eNB), NR, and the like. The transceiver 110 can be configured to communicate with the UE 200 via the wireless communication system.

In one embodiment, the RACH configuration controller 120 configures RMSI information include the RACH configuration. The RACH configuration includes an association between RACH resources and at least one of a SS block and a CSI-RS resource. The association engine 120a is configured to associate the RACH resources and the SS block the CSI-RS resource.

RACH Resource Association: The SS block consists of a PSS, a SSS, and the PBCH. In general, one SS block is sent on one beam. Hence, one SS block is associated with one beam on the TRP DL beam. The association between the SS blocks and the RACH resources and/or RACH preamble indices may be supported for the NR and future wireless systems either via broadcast signaling/indicated to the UE 200 or dedicated signaling. Further, the number of SS blocks that may be supported for NR above 6 GHz is 64. In order to cover 120 degrees azimuth and 30 degrees elevation scan ranges, a total of 64 beams are supported. It is known that such a design is possible by using composite beams from the multiple transceiver units (TXRUs) within a transmission reception point (TRP), which may also lead to beam pattern distortions. This indicates that a best SS block index may only form the association between wide SS block-associated beams and the RACH resources/indices.

Further, such an association is trivially not useful for achieving higher data rates and for fine beam management in the connected mode. Typically such the association may have to be followed up with P1/P2 procedures for the UE 200 in connected mode to determine the best beam for data transfer purposes. In order to avoid such delayed procedures, at least in the handover cases, it is beneficial to rely on cell-specific/non-UE specific reference signal (RS) for forming the association with the RACH resources/preamble indices. If the cell-specific/non-UE specific RS is used as the RS, multiple TXRUs in the TRP can have separate resources in frequency/code/sequence domain for the transmission of the cell-specific/non-UE specific RS. In this case, the UE 200 can receive the cell-specific/non-UE specific RS without any distortion in beam patterns and can establish a high data throughput link with a target base station (such as gNB) soon after the RACH procedure.

Since the RACH procedures for handover case are typically contention free, the association between the CSI-RS resources used for Layer 3 (L3) mobility and the RACH resources in the target base station may be indicated to the UE 200. This procedure enables high data transfer soon after the completion of the RACH procedure. However, it may be clearly noticed that only one association mechanism be defined for the RACH procedure either SS-Block or CSI-RS based and may be indicated to the UE 200. For instance, if no additional RRC signaling is indicated to the UE 200, it can by default assume an SS-block based association; else an additional RRC signaling can indicate the CSI-RS based association.

Consider, 1 SS block=1 SS beam is associated to 1 RACH resource. Further, if several CSI-RS beams are inside the 1 SS block, all of them associated to the 1 RACH resource may cause collisions. Then, each of this CSI resource can be associated with 1 RACH resource. In order to avoid too much of association the following can be done:

each of the RACH resources in frequency around the SS-based RACH resource can be used for the CSI-based mapping. Then in time domain, different SS-based RACH resources can be used; and furthermore, depending on the beam correspondence capability of the UE 200 (which may be exchanged between the source and target base station), the number of Msg1 transmissions may be configured to the UE 200.

Overall the SS block and CSI-RS based associations are feasible. Depending on the need any one of the SS block and CSI-RS resource can be configured and only one may be used at one time instant. If the frequency division multiplexing (FDM) of CSI-RS and SS block is supported, then both of them can support simultaneously. If TDM of CSI-RS and SSS are used, then there may be some delay in accessing one resource versus other. Some tradeoff exists in performing a narrow beam based RACH and a time delay. The SS block and CSI-RS can be configured accordingly. There are three possible options as follows:

option 1: only use CSI-RS based association, no SS block-based association. The UE 200 obtains the CSI-RS configuration information in the SIB, e.g. at the same time as RACH resource configuration;

option 2: configurability between the SS-block and the CSI-RS based association. If the CSI-RS configuration information is included in the SIB then, the UE 200 assumes that the CSI-RS based RACH resource configuration, otherwise it is SS-block based association; and option 3: SS-block based RACH resource configuration. In general, CSI-RS based RACH resource can be configured for contention-free procedure. This kind of CSI-RS can be UE-specific.

This information is carried in the PBCH or the RMSI. The information can be beam-common or beam-specific. Here, the beam refers to SS blocks or CSI-RS. The beam-common indicates that all beams carry all information about all possible associations. However, this results in consuming lots of data. To avoid this each beam can carry each beam's own scheduling information which is the mapping from the SS-block or CSI-RS to the RACH resource which is in time and frequency.

However, if designs are made in a cell-specific manner, then beam-common cannot be avoided. Hence, the following RACH configurations are defined:

option 1: RACH configuration is same across SS blocks. A RACH resource association rule is used for determining the corresponding RACH resource is described below;

option 2: some parts of the configurations is same across SS blocks and the Time/frequency location could be different among different SS blocks; and option 3: RACH configuration is different across SS blocks.

Figure 4:
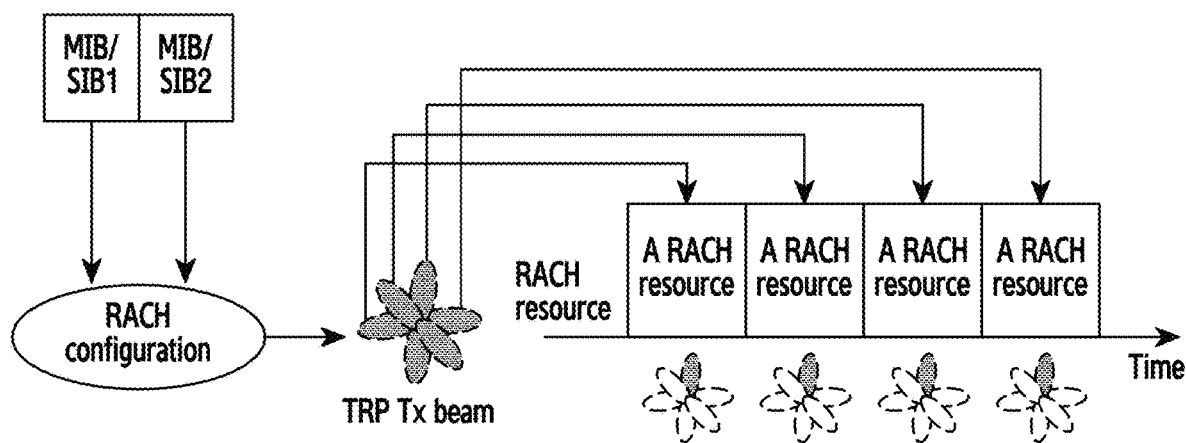
FIG. 4 illustrates an example scenario in which all MIB/SIB messages carry a same information about associations according to an embodiment as disclosed herein.
Figure 5:
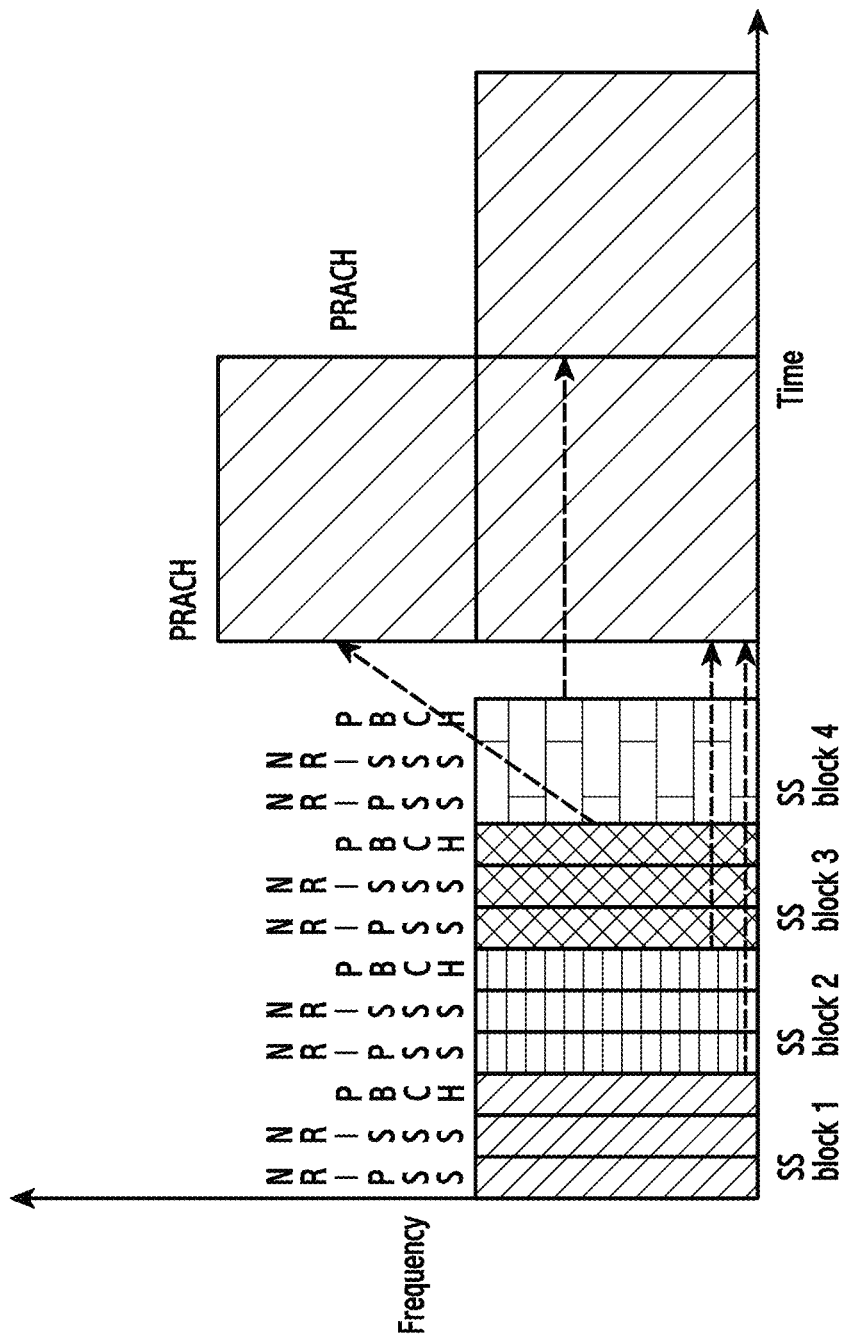
FIG. 5 illustrates an example scenario in which each MIB/SIB message carries a different information about the associations according to an embodiment as disclosed herein.
Figure 6:
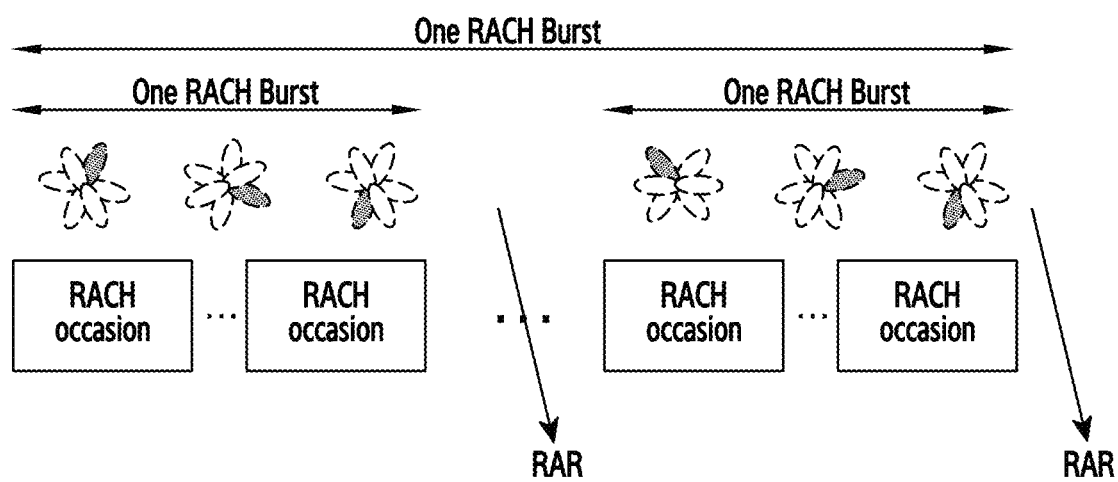
FIG. 6 illustrates an example scenario in which a RACH burst is transmitted in one or more consecutive RACH occasions according to an embodiment as disclosed herein.

The RACH configuration controller 120 of the base station 100 configures the RACH configuration, where the RACH configuration is one of a common RACH configuration across all SS blocks, a part of RACH configuration is common across all SS blocks, and a different RACH configuration across all SS blocks (as shown in FIGS. 4-6). For example, the RACH configuration controller 120 transmits the common RACH configuration across all SS blocks. In an example, the some parts of the RACH configuration are common across all SS blocks. In an example, the different RACH configuration is used for all SS blocks.

RACH resource association rule for initial access RACH: In one embodiment, the RACH resource association rule needs to be appropriately defined and indicated to the user. In one embodiment, the RACH configuration controller 120 is configured to broadcast the RACH configuration in the SS blocks used for RMSI within a cell. The SS block is the beam used by the base station 100 during initial access RACH. The SS block includes the PSS, the SSS and the Physical Broadcast Channel (PBCH). The PBCH includes a MIB message from which a SIB message can be extracted. Further, the SIB message includes the RACH configuration.

The base station 100 can configure the association between SS blocks/CSI-RS and a subset of RACH resources based on:

the subset of RACH resource and one SS block/CSI-RS occasion; and the subset of RACH resource and multiple BCH/SS/CSI-RS occasion.

In one embodiment, the association engine 120*a* is configured to indicate the association by the PBCH includes the MIB messages and one of a RMSI includes the SIB messages and other system information (OSI) includes the SIB messages.

In one embodiment, the association engine 120*a* is configured to indicate the association by an explicit way and an implicit way. In the explicit way, the association engine 120*a* is configured to carry all the MIB/SIB messages carry same information about the association. In the explicit way, the association engine 120*a* is configured to carry each of the MIB messages or SIB messages carry different information about the association (as shown in FIGS. 4-6).

In the implicit way, the association engine 120*a* is configured to indicate the association by an equation based on various parameters such as system frame number (SFN), number of RACH resources etc. as follows by an equation (2):

$$Idx_{RACH}=((Idx_{SSblock}-(SFN*M*N_{RACH}+m*N_{RACH})\%\ N_{SSblocks})\%\ N_{SSblocks}) \quad (2)$$

where $N_{SSblocks}$: (SS blocks transmission per period in slot)*7;

M: number of RACH bursts;

$N_{RACH}$: number of RACH occasions within a RACH burst;

m: 0, . . . M−1;

$Idx_{RACH}$: orthogonal frequency division multiplexing (OFDM) symbol index on where the UE 200 transmits RACH; and $Idx_{SSblock}$: estimated SS block index.

Figure 7:
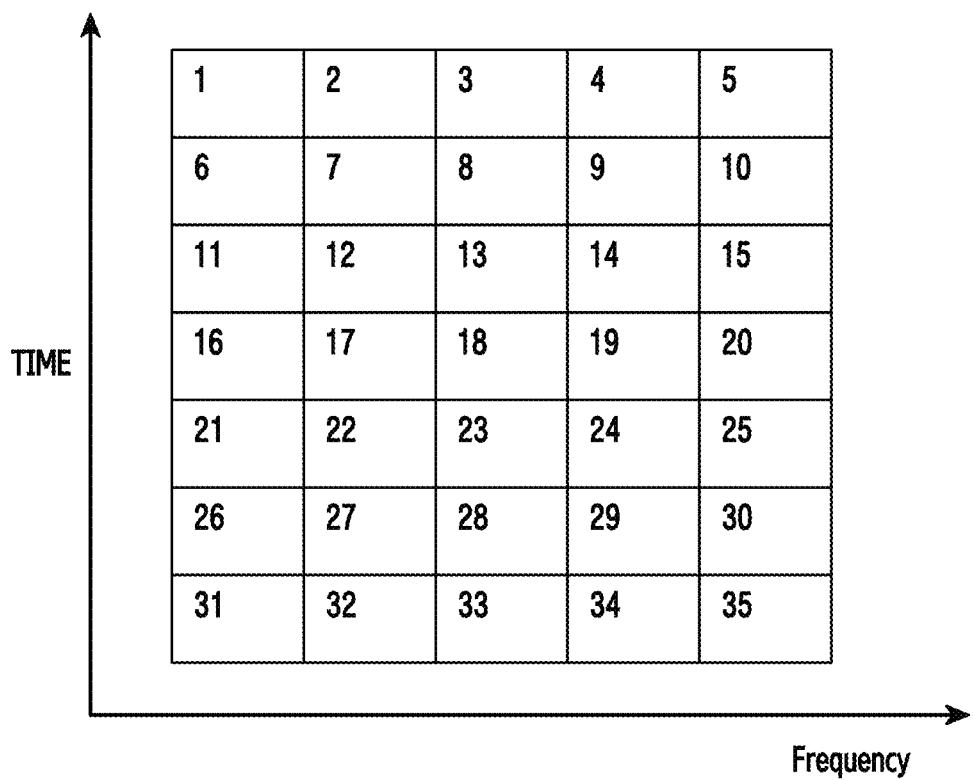
FIG. 7 illustrates an example scenario of numbering the RACH resources based on a frequency-based mapping according to an embodiment as disclosed herein.

In one embodiment, the association engine 120*a* is configured to associate the RACH resources and the one of the SS block and the CSI-RS resource based on at least one of a time based mapping and a frequency based mapping. In an example, the time based mapping is based on mapping of the RACH resource in a time-wise manner and the frequency based mapping is based on mapping of the RACH resource in a frequency-wise manner in the graph as shown in FIG. 7 and FIG. 8.

Figure 9:
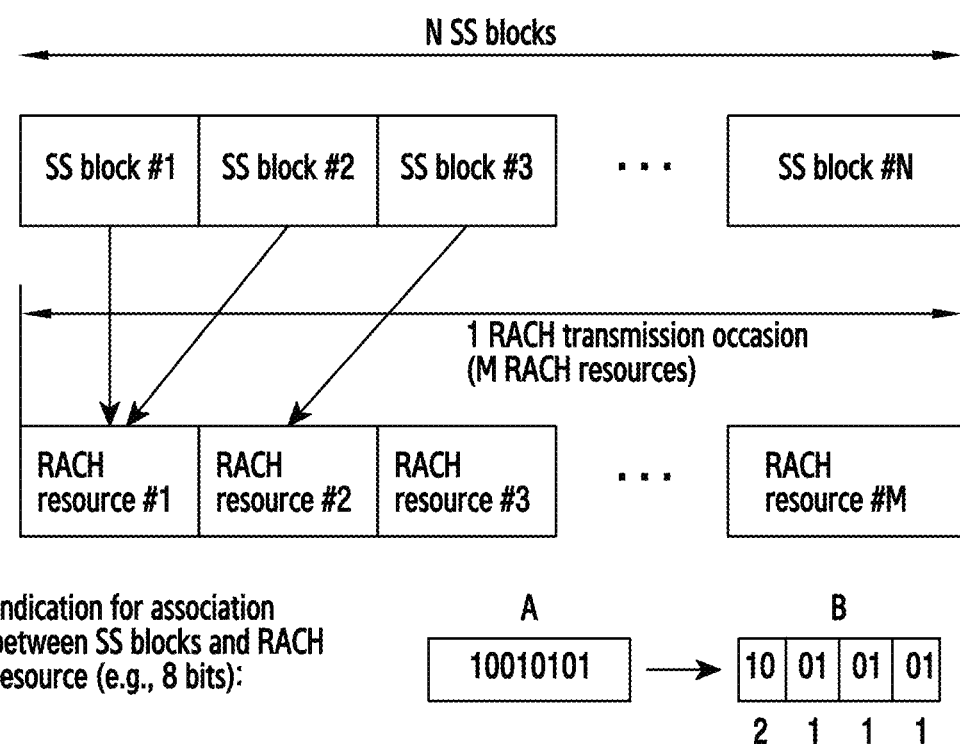
FIG. 9 illustrates an example scenario the association between the SS blocks and the RACH resources according to an embodiment as disclosed herein.
Figure 10:
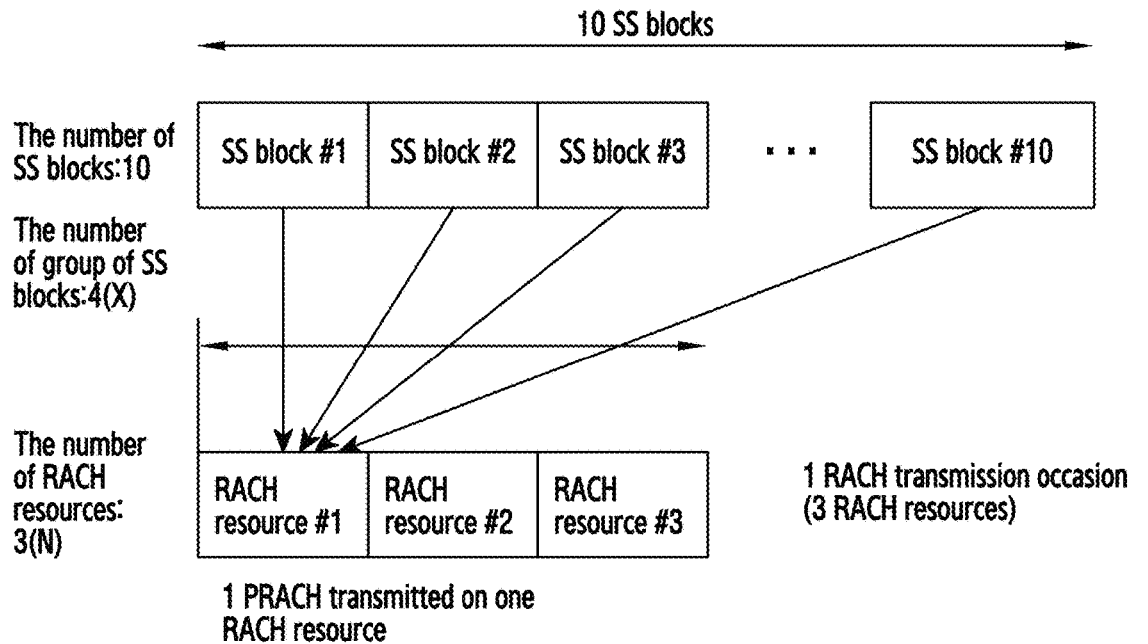
FIG. 10 illustrates an example scenario the association between the SS blocks and the RACH resources according to an embodiment as disclosed herein.
Figure 10:
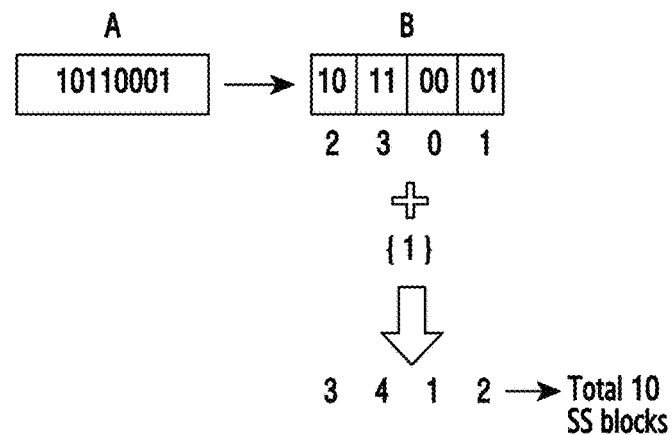
Figure 11:
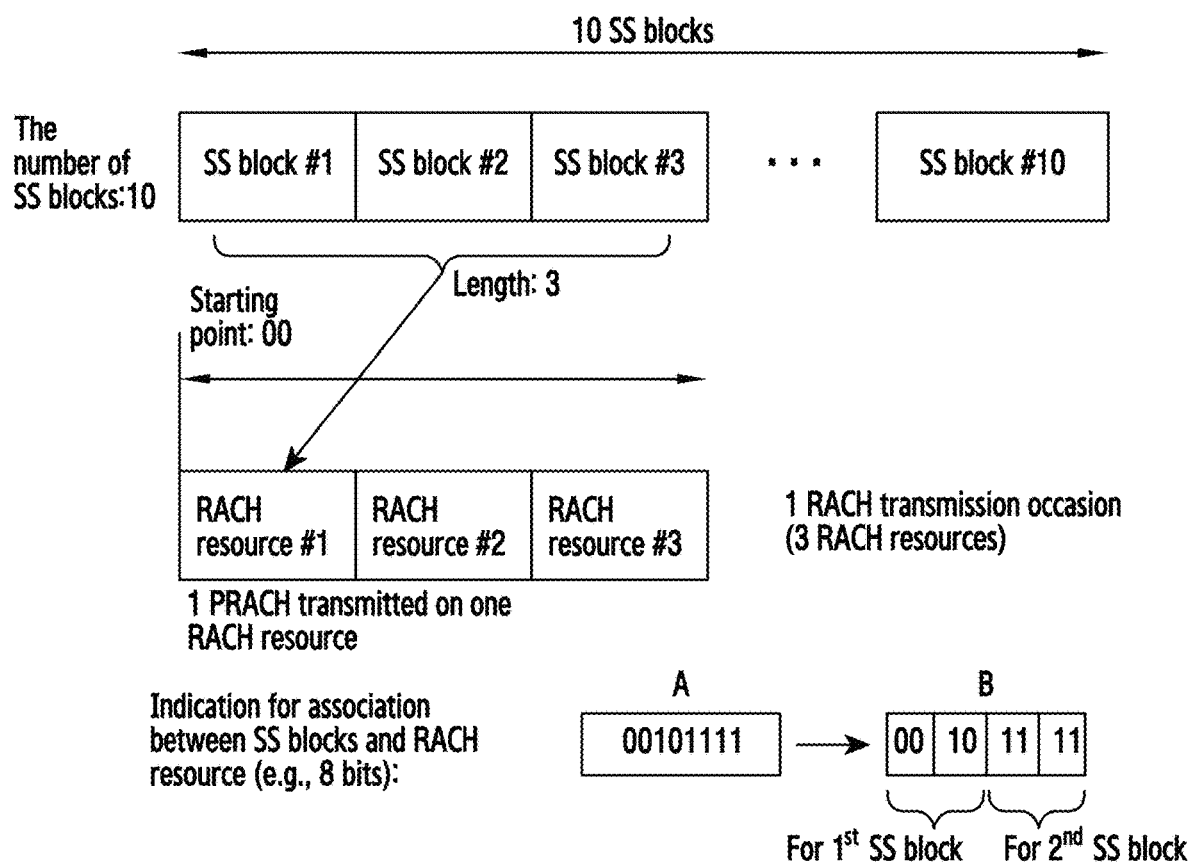
FIG. 11 illustrates an example scenario the association between the SS blocks and the RACH resources according to an embodiment as disclosed herein.

In one embodiment, the base station 100 indicates a plurality of bits for the RACH configuration in the RMSI using at least one of the RMSI, the PDCCH RMSI and the PBCH to the UE 200. Further, indicating the RACH configuration in the RMSI from a MSB of the plurality of bits or from a LSB of the plurality of bits (as shown in FIGS. 9-11). In an example, consider the scenario in which the plurality of bits for the RACH configuration is variable then, the base station 100 indicates to the UE, the plurality of bits in the RMSI and the "x" bits from a total plurality of bits are used for the RACH configuration. Hence, the base station 100 indicates to the UE 200 that the "x" bits are located from the MSB of the total plurality of bits or from the LSB of the total plurality of bits.

In one embodiment, the base station 100 indicates a location of the plurality of bits for the RACH configuration in the RMSI PDSCH using the RMSI PDCCH to the UE 200. In one embodiment, the plurality of bits is fixed for the RACH configuration.

RACH resource association rule for contention free/handover RACH: In one embodiment, the association engine 120*a* configures the association between RACH resources and at least one of multiple SS blocks and multiple CSI-RS resources.

In one embodiment, the association engine 120*a* associates the RACH resources for the handover RACH are at least one of a resource within a same set of PRACH resources used for initial access RACH resources, fully separated from PRACH resources of initial access RACH resources, and partial overlap with initial access RACH resources.

In one embodiment, a relationship between the CSI-RS resources and the SS blocks is based on a quasi co-location (QCL) relationship between the CSI-RS resource and the SS block resources. Further, the association engine 120a associates the RACH resources and the at least one of the multiple SS blocks and the multiple CSI-RS resources based on the QCL relationship between the CSI-RS resource and the SS block resources (as shown in FIGS. 13A-14B).

In an example, when the CSI-RS and the SS blocks are associated based on the QCL, then all the configuration parameters of the CSI-RS is same as the SS block configuration parameters and/or some of the configuration parameters of the CSI-RS are same as the SS block configuration parameters.

In one embodiment, the communicator 130 is configured to communicate with the UE 200 and internally between hardware components in the base station 100. In one embodiment, the processor 140 is configured to process various instructions stored in the memory 150 for managing the RACH configuration in the wireless communication system.

The memory 150 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 150 may, in some examples, be considered a non-transitory storage medium. The term "non-transitory" may indicate that the storage medium is not embodied in a carrier wave or a propagated signal. However, the term "non-transitory" may not be interpreted that the memory 150 is non-movable. In some examples, the memory 150 can be configured to store larger amounts of information than the memory. In certain examples, a non-transitory storage medium may store data that can, over time, change (e.g., in random access memory (RAM) or cache).

In one embodiment, the UE 200 includes a transceiver 210, a RACH configuration controller 220 includes an association engine 220a, a communicator 230, a processor 240 and a memory 250. The transceiver 210 can be configured to communicate with the base station 100 via the wireless communication system.

The UE 200 can include, for e.g., a cellular telephone, a smartphone, a personal computer (PCs), a minicomputer, a desktop, a laptop, a handheld computer, PDA, or the like. The UE 200 may support multiple Radio access technologies (RAT) such as, for e.g., code-division multiple access (CDMA), general packet radio service (GPRS), evolution-data optimized EVDO (EvDO), time-division multiple access (TDMA), global system for mobile communications (GSM), worldwide interoperability for microwave access (WiMAX) technology, LTE, LTE advanced and 5G communication technologies.

In one embodiment, the RACH configuration controller 220 is configured to receive the RMSI information includes the RACH configuration from the base station 100. The RACH configuration includes an association between RACH resources and one of the SS block and the CSI-RS resource. The association engine 220a is configured to associate the RACH resources and SS block and the CSI-RS resource.

In one embodiment, the RACH configuration controller 220 is configured to receive the RACH configuration in the SS blocks used for the RMSI within the cell.

In one embodiment, the RACH configuration controller 220 is configured to decode the plurality of bits for the RACH configuration in the RMSI using at least one of the RMSI, the PDCCH RMSI and the physical broadcast channel (PBCH) from the base station 100.

In one embodiment, the RACH configuration controller 220 is configured to decode the RACH configuration in the RMSI starting from the MSB of the plurality of bits or from the least significant bit (LSB) of the plurality of bits. For example, consider the scenario in which the plurality of bits for the RACH configuration is variable then, the UE 200 decodes the "x" bits of the RACH configuration from the MSB of the plurality of bits or from the LSB of the plurality of bits.

In one embodiment, the RACH configuration controller 220 is configured to decode the location of the plurality of bits for the RACH configuration in the RMSI PDSCH using the RMSI PDCCH from the base station 100.

In one embodiment, the RACH configuration controller 220 is configured to perform the random access procedure based on the association.

In one embodiment, the RACH configuration controller 220 is configured to receive the association between RACH resources and the at least one of the multiple SS blocks and the multiple CSI-RS resources from the base station 100. Further, the RACH configuration controller 220 is configured to perform the random access procedure for the handover RACH based on the association.

In one embodiment, the RACH configuration controller 220 is configured to receive the numerology for at least one of the RACH message 1, the RACH message 2, the RACH message 3, and the RACH message 4 in the RACH configuration in the RMSI.

In one embodiment, the communicator 230 is configured to communicate with the UE 200 and internally between hardware components in the base station 100. In one embodiment, the processor 240 is configured to process various instructions stored in the memory 250 for managing the RACH configuration in the wireless communication system.

The memory 250 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 250 may, in some examples, be considered a non-transitory storage medium. The term "non-transitory" may indicate that the storage medium is not embodied in a carrier wave or a propagated signal. However, the term "non-transitory" may not be interpreted that the memory 250 is non-movable. In some examples, the memory 250 can be configured to store larger amounts of information than the memory. In certain examples, a non-transitory storage medium may store data that can, over time, change (e.g., in random access memory (RAM) or cache).

Although the FIG. 2 shows various hardware components of the base station 100 and the UE 200 but it is to be understood that other embodiments are not limited thereon. In other embodiments, the base station 100 and the UE 200 may include less or more number of components. Further, the labels or names of the components are used only for illustrative purpose and does not limit the scope of the present disclosure. One or more components can be combined together to perform same or substantially similar function of managing the RACH configuration in the wireless communication system.

Figure 3:
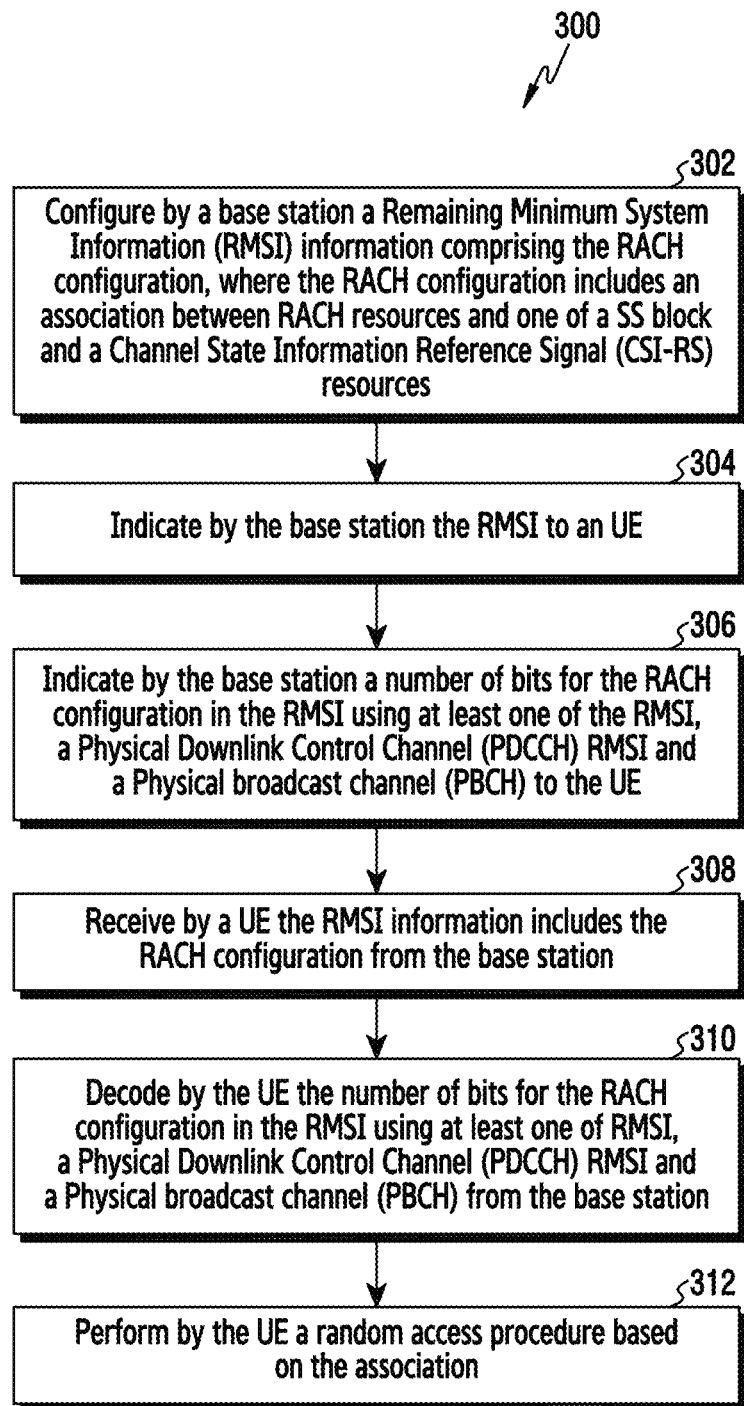
FIG. 3 illustrates a flow diagram various operations for performing a random access procedure based on an association between RACH resources and at least one of a SS block and a CSI-RS resource according to an embodiment as disclosed herein.

FIG. 3 illustrates a flow diagram 300 various operations for performing the random access procedure based on the association between the RACH resources and the SS blocks and the CSI-RS resource, according to an embodiment as disclosed herein.

Initial Access RACH: at 302, the method includes configuring by the base station 100 the RMSI information includes the RACH configuration, where the RACH configuration includes the association between RACH resources and one of the SS block and the CSI-RS. In one embodiment, the method allows the RACH configuration controller 120 to configure the RMSI information includes the RACH configuration, where the RACH configuration includes the association between RACH resources and one of the SS block and the CSI-RS resource.

At 304, the method includes indicating by the base station 100 the RMSI to the UE 200. In one embodiment, the method allows the RACH configuration controller 120 to indicate the RMSI to the UE 200.

At 306, the method includes indicating by the base station 100 a plurality of bits for the RACH configuration in the RMSI using at least one of the RMSI, the PDCCH RMSI and the PBCH to the UE 200. In one embodiment, the method allows the RACH configuration controller 120 to indicate the plurality of bits for the RACH configuration in the RMSI using at least one of the RMSI, the PDCCH RMSI and the PBCH to the UE 200.

In one embodiment, the RACH configuration controller 120 indicates the RACH configuration in the RMSI from the MSB of the plurality of bits or from the LSB of the plurality of bits.

In one embodiment, if the RMSI PDSCH consists of some field corresponding to other field information, then the MSB to X bits (where X is the length of the RACH configuration which indicates the association) can be used for the decoding of RACH configuration and further from X+1 can be used for decoding the other fields carried in the RMSI.

Further, the RACH configuration controller 120 is configured to indicate the location of the plurality of bits for the RACH configuration in the RMSI PDSCH using the RMSI PDCCH to the UE 200. Further, the plurality of bits is fixed for the RACH configuration Consider a scenario in which L' represents a length of the data vector indicating the mapping, where L'<=L where L is the actually transmitted number of SS blocks. If such an indication is provided via PBCH, then the mapping for RACH configuration can also be defined only for the case of L' SS blocks. Further, not only for number of actual SS blocks, but also the SS block indices is needed for the purpose. And "X" bits for RACH configurations are fixed in specification. Further, the base station 100 indicates the RMSI PDSCH location via RMSI PDCCH and the association of the RACH configuration, i.e. the location inside the RMSI PDSCH. Further, RMSI PDSCH is decoded by the UE 200 and the fixed plurality of "X" bits is taken for RACH configuration.

Further, even when L' is indicated in RMSI or even in PBCH, the PRACH configuration may be of variable size as L' is depending on the network implementation. The procedure may be supported via the variable bit map size RACH configuration. If actually transmitted SS blocks are not sent, then the fixed bit size map based RACH configuration may be considered.

At 308, the method includes receiving by the UE 200 the RMSI information includes the RACH configuration from the base station 100. In one embodiment, the method allows the RACH configuration controller 220 to receive the RMSI information includes the RACH configuration from the base station 100.

At 310, the method includes decoding by the UE 200 the plurality of bits for the RACH configuration in the RMSI using at least one of RMSI, the PDCCH RMSI and the PBCH from the base station 100. In one embodiment, the method allows the RACH configuration controller 220 to decode the plurality of bits for the RACH configuration in the RMSI using at least one of RMSI, the PDCCH RMSI and the PBCH from the base station 100.

In one embodiment, the RACH configuration controller 220 is configured to decode the RMSI PDSCH and then first "X" bits can be considered if the MSB is indicated for the RACH configuration or last "X" bits can be considered if LSB is indicated for the RACH configuration.

Further, the RACH configuration controller 220 is configured to decode the location of the plurality of bits for the RACH configuration in the RMSI using the RMSI PDCCH from the base station 100.

At 312, the method includes performing by the UE 200 the random access procedure based on the association. In one embodiment, the method allows the RACH configuration controller 220 to perform the random access procedure based on the association.

The various actions, acts, blocks, steps, or the like in the flow diagram 300 may be performed in the order presented, in a different order or simultaneously. Further, in some embodiments, some of the actions, acts, blocks, steps, or the like may be omitted, added, modified, skipped, or the like without departing from the scope of the present disclosure.

FIG. 4 illustrates an example scenario in which all MB/SIB messages transmit the same information about associations, according to an embodiment as disclosed herein.

In one embodiment, the base station 100 includes the association engine 120a configured to perform the association between the RACH resources and one of the SS block and the CSI-RS resource. In another embodiment, the association engine 120a is configured to perform the association between the RACH resources and at least one of the multiple SS blocks and multiple CSI-RS resources.

In one embodiment, the base station 100 includes the association engine 120a configured to indicate the association between the RACH resources and one of the SS block and the CSI-RS resource. In another embodiment, the base station 100 includes the association engine 120a configured to indicate the association between the RACH resources and at least one of the multiple SS blocks and multiple CSI-RS resources. The base station 100 includes three ways of indicating the association to the UE 200. In one example of explicit indication: all of the MIB/SIB messages carry the same information about associations; and each MIB/SIB message carriers the different information about associations.

In one example of implicit indication, a pre-defined equation is used.

The PBCH includes the MIB messages and the one of RMSI include the SIB messages and OSI include the SIB messages. As shown in the FIG. 4, all the MIB messages and the SIB messages carry same information about associations.

Further, parameters needed for the RACH configuration are as follows:
system frame number (SFN);
number of RACH sub-frames within a system frame (NS);

sub-frame number within system frame number (ns);

the number of sub-frames for the period that a gNB receives MSG1 with Rx beam sweeps if supportable number of Rx beams are less than the total number of Rx beams in a system frame;

symbol indices corresponding the SS blocks and mapping within sub-frame depending on the preamble format (NOS, 7-bit or 14-bit long bit-map to indicate the symbols where the PRACH can be sent, define RACH mapping pattern similar to SS block mapping pattern); and number of sub bands and the UE 200 can randomly choose a sub-band inside these for Msg1 transmission or the UE 200 can be indicated by the gNB explicitly which sub-band to use.

In one embodiment, the frequency position (starting/center/end) for the RACH resources may be indicated as an offset from the SS block or from the RMSI location or from the wideband carrier center which may be indicated in the PBCH/RMSI. The Resource blocks (RB's) and the number of RB's allocated per RACH resource for an SS block may be indicated in the RACH configuration sent via the RMSI. In the case of implicit mapping, a simple rule may be defined such that "X" number of SS blocks is mapped to each RACH resource. This number "X" may be sent to the UE 200 via RACH configuration.

FIG. 5 illustrates an example scenario in which each MIB/SIB message carries the different information about associations according to an embodiment as disclosed herein. In one embodiment, the MIB/SIB message carries the association between the SS block and the RACH resources. As shown in the FIG. 5, each SS block (i.e., the SS block 1, SS block 2, SS block 3 and SS block 4) has different RACH resources as indicated by a different shading.

TABLE 1

Advantage of the explicit indicating of RACH resources:

| Explicit indication | Advantages |
| --- | --- |
| All of the MIB/SIB messages carry the same information about associations | Possible to broadcast channel (BCH) combining |
| Each MIB/SIB message carry the different information about associations | Low overhead |

FIG. 6 illustrates an example scenario in which a RACH burst is transmitted in one or more consecutive RACH occasions according to an embodiment as disclosed herein.

As shown in the FIG. 6, each RACH burst is transmitted in one or more consecutive RACH occasion. Further, the pre-defined equation for indicating the RACH configuration is defined below equation (3):

$$[SFN, \text{Subframe index}, \text{OFDM symbol index}] = f(\text{parameters}) \quad (3)$$

In one embodiment, the parameters of RACH configuration include SFN, # of SS blocks, # of RACH occasions, and # of RACH burst in one RACH Burst set. The RACH burst includes one or multiple consecutive RACH occasions. Further, the RACH burst set covers a full beam sweep corresponding to a SS burst set or the CSI-RS for L3 mobility configuration.

Implicit indication: In one embodiment, the RACH configuration controller 120 is configured to indicate the association between the RACH resource and the SS block and CSI-RS resource to the UE 200 using the pre-defined equation (2).

FIG. 7 illustrates an example scenario of numbering the RACH resources based on the frequency-based mapping according to an embodiment as disclosed herein.

As shown in the FIG. 7, a many-to-one mapping for the case of mapping between SS blocks and the RACH resources is illustrated. In such cases, higher order polynomials may be supported and an equation based mapping may not be flexible and feasible. Further, the number of parameters to be indicated to identify the higher order polynomial may change depending on network operator. Such a procedure entails a flexible plurality of bits to be provided in the RACH configuration which may or may not be desirable. Further these calculations can be complex at the UE side. Hence, considering these facts, a bit-map based association between the SS blocks and the RACH resources is desirable. A bit-map provides the association between the SS blocks and the RACH resources. Based on the association, the actual plurality of bits used for transmitting the SS block is indicated by the bit-map.

FIG. 8 illustrates an example scenario of a random association between the SS blocks and the RACH resources according to an embodiment as disclosed herein. As shown in the FIG. 8, an example mapping is done between the SS blocks and the RACH resources. The multiple SS blocks are shown to be associated with same RACH resource. The length of the above data field may be "L" where "L" is the total number of SS blocks sent by the base station 100. The numbering of PRACH resources and mapping between SS blocks and PRACH resources are illustrated in FIG. 9. The mapping can be done in following procedure: time-wise manner/time based mapping; and frequency-wise manner/frequency based mapping.

In one embodiment, the frequency-wise numbering is preferred because the number of SS RACH resources needed in time may depend on network implementation such as number of SS blocks supported by a network. For example, small number of RACH slots (or symbols) is needed for the case of supporting a network with small number of SS blocks. Since the number of RACH sub bands and the size of each sub band are indicated via the RACH configuration, the frequency size of the RACH allocation can be easily calculated by the UE 200. Then depending on the mapping indicated between SS blocks and RACH resources, the UE 200 can infer whether the RACH resource belongs to next time instant or the current time instant.

Further, depending on the mapping indicated between SS blocks and RACH resources, the UE 200 can infer whether the RACH resource belongs to next time instant or the current time instant. Further "L" SS blocks are considered. When the gNB decides to use two RACH resources for these L SS blocks, then the gNB can use 1 bit to indicate which RACH resource is associated with a corresponding SS block via a "L" length vector as [0 1 0 0 1 1 . . . ] where 0 in $i^{th}$ position indicates that $i^{th}$ SS block may have to use the 1st RACH resource whereas a 1 may indicate that the 2nd RACH resource may be used for sending Msg1. Similarly, if four RACH resources are used by the gNB then the L length vector may look like [00 01 10 00 11 00 10 . . . ].

Further, the size of the indication is varying in size depending on the total number of resources allotted by the gNB for the RACH purpose. Since the RACH configuration is indicated via RMSI PDSCH, the size of the configuration may be explicitly indicated to the UE 200 via RMSI PDCCH itself or PBCH. This enables the UE 200 to decode the RACH configuration per gNB control and also provides flexibility to the gNB.

Further, when the fixed size of RACH configuration is provided, it restricts the gNB flexibility considering that many-to-one mapping may be supported for the case of NR-RACH. Hence, the advantages and drawbacks of the fixed size RACH configuration versus variable size RACH configuration are illustrated in FIGS. 9-11. The bitmap size depends on time and frequency resources allocated by the network. In frequency domain, the size depends on number of sub-bands and in time domain, the size depends on network implementation depending on where the size wants the RACH resources to be located. The RACH configuration is indicated via the RMSI. One potential way to is to allow the network to indicate explicitly the bit map size needed for the RACH configuration via the RMSI which explicitly mentions the size of the bit-map used for RACH configuration. Further, another way is to fix the number in specification. Further, it is explicitly indicated that the following methods can be considered:

the base station 100 indicates to the UE 200 via the PBCH where plurality of bits of RMSI PDSCH is indicated corresponding to the RACH configuration;

RMSI PDCCH indicates the RMSI PDSCH allocation and also the bits allotted for RACH configuration; and fixed in specification for the carrier frequency based on number of SS blocks, which may limit gNB implementation.

FIG. 9 illustrates an example scenario illustrating the association between the SS blocks and the RACH resources according to an embodiment as disclosed herein. As shown in the FIG. 9, an indication bit representing how many SS blocks are associated with each RACH resources which are supported in RMSI/PBCH/fixed in specification. Some parts could be fixed in specification and some could be indicated via PBCH/RMSI. For e.g., option (A): total number of indication bits, 8 bits (1 0 0 1 0 1 0 1); and option (B): number of bits (such as 2 bits) to indicate how many SS blocks are associated with each RACH resource, (2 1 1 1).

In one embodiment, the indication bits means that the first two SS blocks, third SS block, fourth SS block, and fifth SS block are associated with the first RACH resource, second RACH resource, third RACH resource, and fourth RACH resource, respectively. The indication bits can be reduced and the indication bit can support non-uniform association between SS blocks and RACH resources. Further, the option (A) is the overall bit map which may be read consecutively. Then depending on the plurality of bits that may be read consecutively, the mapping in a consecutive fashion is defined per RACH resource and the SS blocks.

FIG. 10 illustrates an example scenario illustrating the association between the SS blocks and the RACH resources, according to an embodiment as disclosed herein. In one embodiment, the indication bit represents an "X" group of the SS blocks which is associated with N RACH resource. This provides a size for each group. As shown in the FIG. 10, the option (A) including indication bits of 8 bits (10110001) may be considered and option (B) including the number of size of group is considered: 2 bits, therefore, the UE 200 interprets from A to C ({10} {11} {00} {01}), where C ({10} {11} {00} {01}) is added with "1" bit e.g. (2 3 0 1)+(1)=(3 4 1 2), totally 10 number of SS blocks.

The number of the SS blocks is 10 SS blocks and the number of group of SS block is 4(X). A 1st group of SS block (3 SS blocks) is associated with a 1st RACH resource. A 2nd group of SS block (4 SS blocks) is associated with a 2nd RACH resource. A 3rd group of SS block (1 SS block) is associated with a 3rd RACH resource. A 4th group of SS block (2 SS blocks) is associated with the 1st RACH resource. Hence, totally 10 SS blocks are associated with the RACH resource based on a sequential ordering.

Further, wrap-around mechanisms are possible to ensure that the mapping may take care of the fact that remaining SS blocks may also be mapped to the RACH resources.

FIG. 11 illustrates an example scenario the association between the SS blocks and the RACH resources according to an embodiment as disclosed herein.

In one embodiment, the indication bit(s) representing which group of SS blocks are associated with RACH resource. The indication bit is made up starting point of SS blocks and length. Further, additional signaling includes the size of each indication bit (if necessary), # of indication bits, etc.

Consider, A has two indication bits: $1^{st}$ indication bit (00 (starting point), (10) length): From $1^{st}$ SS blocks to $3^{rd}$ SS blocks are associated with $1^{st}$ RACH resource; and $2^{nd}$ indication bit (11(starting point), (11) length): from $4^{th}$ SS blocks to $7^{th}$ SS blocks are associated with $2^{nd}$ RACH resource.

In one embodiment, the scenario provides more flexibility and can easily support non-uniform mapping, non-consecutive mapping via the mechanism. The total number of bits may be indicated explicitly via the RMSI/PBCH/fixed in 3GPP specifications.

Figure 12:
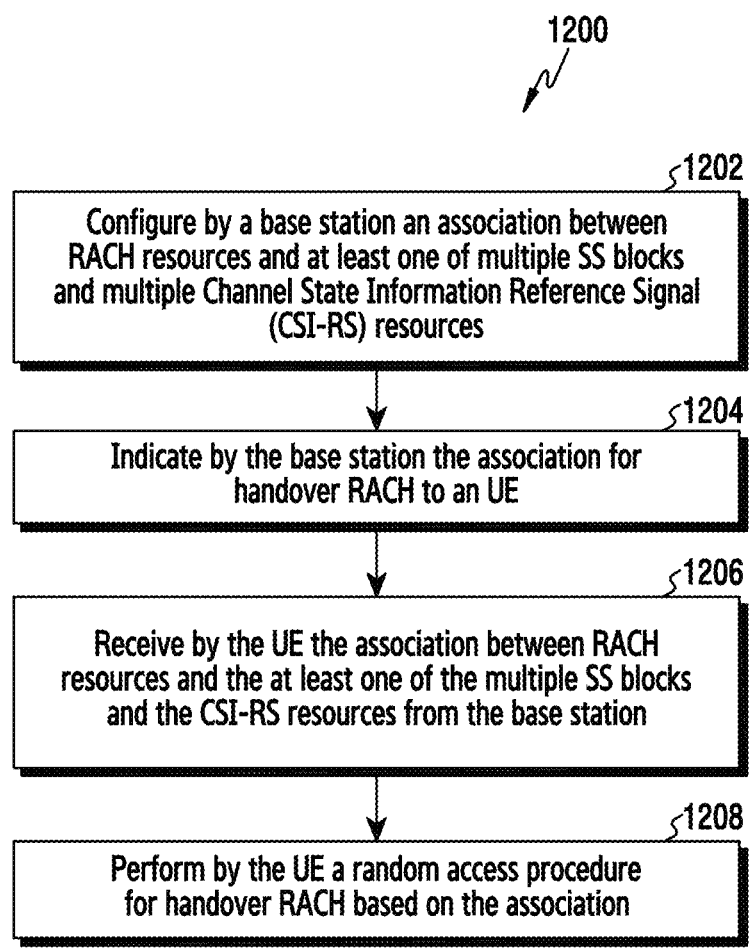
FIG. 12 illustrates is a flow diagram various operations for performing the random access procedure for a handover RACH based on the association between the RACH resources and at least one of multiple SS blocks and multiple CSI-RS resources according to an embodiment as disclosed herein.

FIG. 12 illustrates a flow diagram 1200 illustrating various operations for performing a random access procedure for the handover RACH based on the association between RACH resources and at least one of multiple SS blocks and multiple CSI-RS resources, according to an embodiment as disclosed herein.

Contention free RACH: At 1202, the method includes configuring by the base station 100 the association between RACH resources and the at least one of multiple SS blocks and multiple CSI-RS resources. In one embodiment, the method allows the RACH configuration controller 120 to configure the association between RACH resources and the at least one of multiple SS blocks and multiple CSI-RS resources.

At 1204, the method includes indicating by the base station 100 the association for the handover RACH to the UE 200. In one embodiment, the method allows the RACH configuration controller 120 to indicate the association for the handover RACH to the UE 200.

At 1206, the method includes receiving by the UE 200 the association between RACH resources and the at least one of the multiple SS blocks and the CSI-RS resources from the base station 100. In one embodiment, the method allows the RACH configuration controller 220 to receive the association between RACH resources and the at least one of the multiple SS blocks and the CSI-RS resources from the base station 100.

Further, at 1208, the method includes performing by the UE 200 the random access procedure for the handover RACH based on the association. In one embodiment, the method allows the RACH configuration controller 220 to perform the random access procedure for the handover RACH based on the association.

The various actions, acts, blocks, steps, or the like in the flow diagram 1200 may be performed in the order presented, in a different order or simultaneously. Further, in some embodiments, some of the actions, acts, blocks, steps, or the like may be omitted, added, modified, skipped, or the like without departing from the scope of the present disclosure.

Figure 13A:
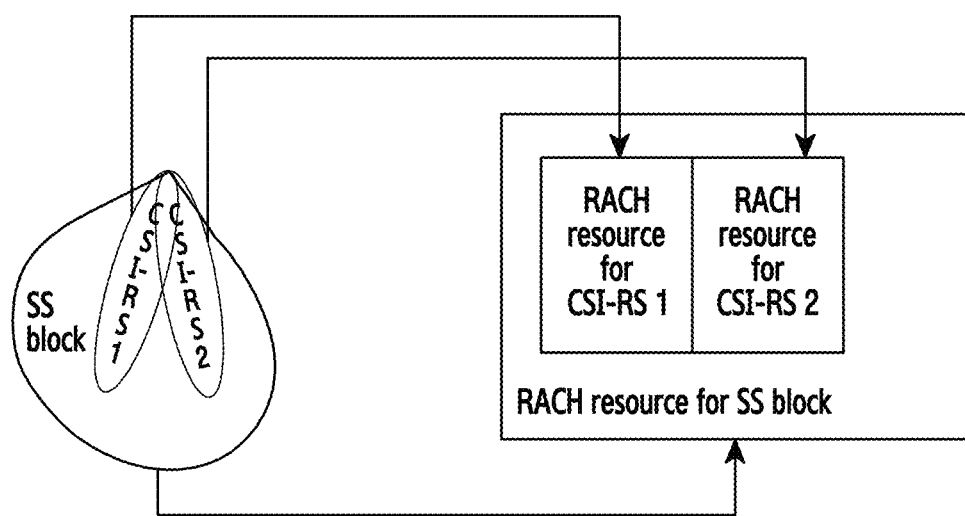
FIG. 13A and FIG. 13B illustrate schematic diagrams the association between the CSI-RS resources and the RACH resources based on a QCL relationship between the CSI-RS resources and the SS blocks according to an embodiment as disclosed herein.
Figure 13B:
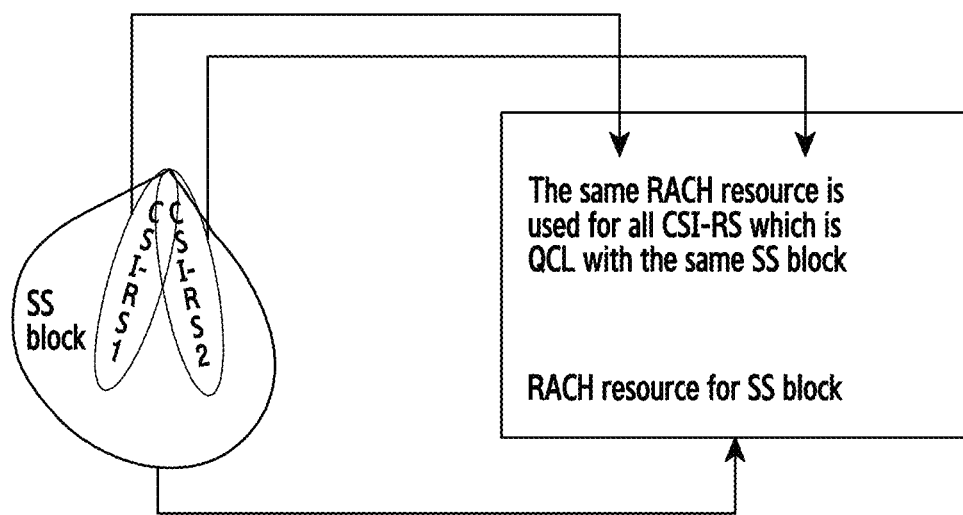

FIG. 13A and FIG. 13B illustrate schematic diagrams the association between the CSI-RS resources and the RACH resources based on the QCL relationship between the CSI-RS resources and the SS blocks, according to an embodiment as disclosed herein.

As shown in the FIGS. 13A and 13B, an explicit mapping between the CSI-RS resources are measured by the UE 200 and the PRACH resources to be used for the ensuing contention-free RACH. In case of the handover, such mapping may be necessary since the UE 200 may not know the entire mapping and QCL information of all SS blocks and the CSI-RS blocks of the target cell. Further, the entire RACH configuration may or may not be passed to the UE 200 for keeping the size of the handover command and a payload of the RACH configuration to manageable sizes.

Further, for the handover case, the UE 200 has already received the RACH configuration via the RMSI of the source cell. Further, a coarse time frequency location may be first indicated (coarse grid indication), for example in terms of the starting point in time and frequency. Further, the UE 200 may infer some mapping between CSI-RS and SS block (based on some resources measured for CSI-RS and SS) to identify the exact resource within this coarsely indicated grid, or the UE 200 can be configured to send the RACH on the same SS block based RACH resources based on the mapping between CSI-RS and SS blocks i.e., if CSI-RS resources 1 and 2 correspond to the SS block 1, then the UE 200 may send RACH for CSI RS resources 1 and 2 on the RACH resources associated with the SS block 1 and defined in the RACH configuration as shown in the FIG. 13A, or the UE 200 can be configured to explicitly indicate a time offset/frequency offset between the SS based RACH resource and the CSI-RS based RACH resources along with QCL information between the SS blocks and CSI-RS blocks/beams as shown in the FIG. 13B, or the UE 200 can be configured to explicitly indicate the RACH resources for the CSI-RS resources/beams.

Location of resources for contention-free RACH: As the resources for handover (HO)/contention-free RACH can be (a) the resource within a same-set of PRACH resources as used for initial access RACH (b) fully separated from PRACH resources of initial access (c) partial overlap with initial access resources.

The LTE uses option (a). Same mechanism can be used. For option (b), then much faster access for handover cases is possible. The UE 200 has handover as a high priority. If needed some resources from the initial access RACH resources can also be used. If UE 200 is moving very fast, some periodicity for the configuration of these RACH resources can also be considered such as SPS. It can be network configurable. The initial access PRACH resources can be a fallback for the UE 200 to perform contention free RACH for HO. This is better when the load is higher. Better for faster data rates improvements. Sometimes the overhead of this procedure may be more. As soon as the UE 200 performs connection establishment, the base station 100 can immediately send a signal to stop the periodic resource allocation. For option (c), it is a combination of option (a) and option (b). And based on the tradeoffs, (c) can be chosen.

Contention-free RACH: the SS-block represents common wide beams; the cell-specific CSI-RS represents common narrow beams; also known as set2; and further, the UE-specific CSI-RS represents dedicated narrower beams; also known as set1.

Each of these RS can be associated with some RACH resources for the UE 200 to perform the RACH configuration. These resources may be referred to as SS-based RACH resources, set1-based and set2-based RACH resources.

Based on the above description, the following conclusions are achieved. For contention free RACH, the following procedures can be used. The UE 200 performs neighbor cell measurements based on SS or set2. Based on the reports sent by the UE 200, following options are feasible.

In one example, the UE 200 performs measurements on SS and RACH is performed on SS-based resources (beam refinement during Msg2 is possible to set2 or set1, feasibility not known).

In one example, the UE 200 performs measurements on SS and HO command includes set2 resources on which RACH is performed (beam refinement during Msg2 is possible to set1).

In one example, the UE 200 performs measurements on set2, and RACH on the set2-based RACH resources after HO command is obtained (beam refinement during Msg2 is possible to set1).

In one example, the UE 200 performs measurements on set2, and HO command includes set1 resources on which RACH is performed (no more beam refinement).

For dedicated RACH resources, the UE 200 can be associated with the following: cell specific CSI resources present, inside this one resource is given to the UE 200 and one preamble. Or resources based on UE specific CSI resources can be given to the UE 200. This way all resources may be dedicated configured per UE 200.

In one embodiment, the cell specific CSI-RS configuration can be 1 bit indication in the system information. If present, the UE 200 can use CSI associations, else the UE 200 can fallback to SS based associations.

For future wireless systems, diversity mechanisms for contention free RACH may be explored. Since UE capability is known, the UE 200 may use some Tx diversity mechanisms for PRACH. These mechanisms can be similar to PUCCH Tx diversity mechanisms used in LTE: SORTD, SFBC, SCDD, time domain pre-coder cycling, frequency hopping etc. so as to improve the performance of the RACH procedures. These can also be sued for unlicensed bands where the UE 200 information already exists and some additional configuration is needed. Also this needs advanced PRACH receivers.

Figure 14A:
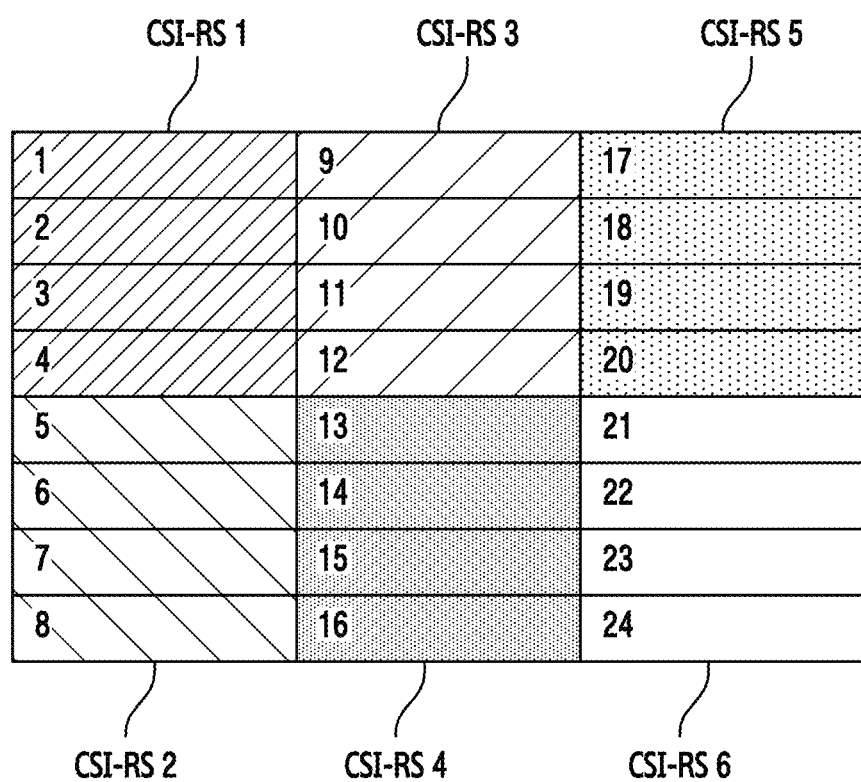
FIG. 14A illustrates a schematic diagram the association between the CSI-RS resources and the RACH resources in a sequence order based on a CSI-RS index for all CSI-RS resources according to an embodiment as disclosed herein.

FIG. 14A illustrates a schematic diagram the association between the CSI-RS resources and the RACH resources in the sequence order based on a CSI-RS index for all CSI-RS resources, according to an embodiment as disclosed herein. In one embodiment, the number of resources given to one CSI-RS RACH resource depends on the preamble format. If one-one mapping is allowed for CSI-RS i.e., the many-to-one mapping is not allowed for CSI-RS RACH, then an equation based mapping can be allowed from a set of resources starting from the frequency first mapping, the UE 200 can access the resources for CSI-RS RACH.

Figure 14B:
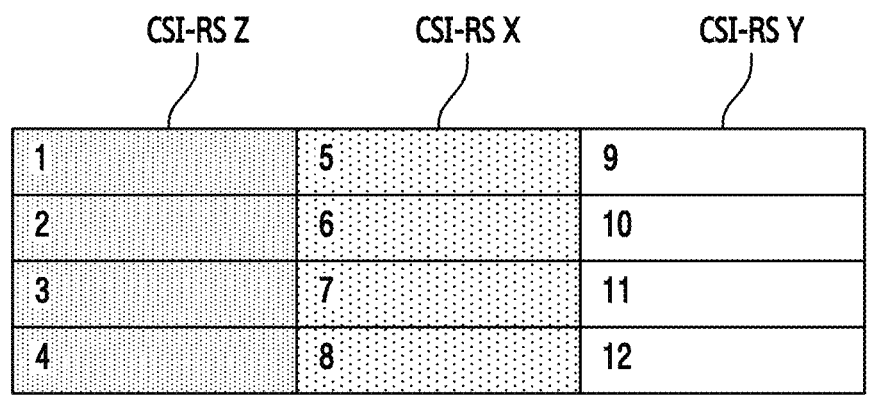
FIG. 14B illustrates a schematic diagram the association between the CSI-RS resources and the RACH resources in the sequence order based on the CSI-RS index for the handover RACH according to an embodiment as disclosed herein.

FIG. 14B illustrates a schematic diagram illustrating the association between the CSI-RS resources and the RACH resources in the sequence order based on the CSI-RS index for the handover RACH according to an embodiment as disclosed herein.

In one embodiment, the number of resources given to one CSI-RS RACH resource depends on the preamble format used for handover purposes. Further, for handover case, the UE 200 may be reporting only a few number of CSI-RS resources. The RACH resources may be given only corresponding to these CSI-RS resources. for non-contention based random access NR, if there is no collision issue for non-contention based random access, the procedure of non-contention based random access is much simplified and only consists of two steps. In the first step, the UE 200 transmits configured preamble on the PRACH and in the second step, the UE 200 receives random access response. The non-contention based random access can be used in various cases. In an example, in handover case, the target gNB may configure dedicated preamble as well as PRACH to the UE 200 and the UE 200 may perform non-contention based random access.

Figure 15:
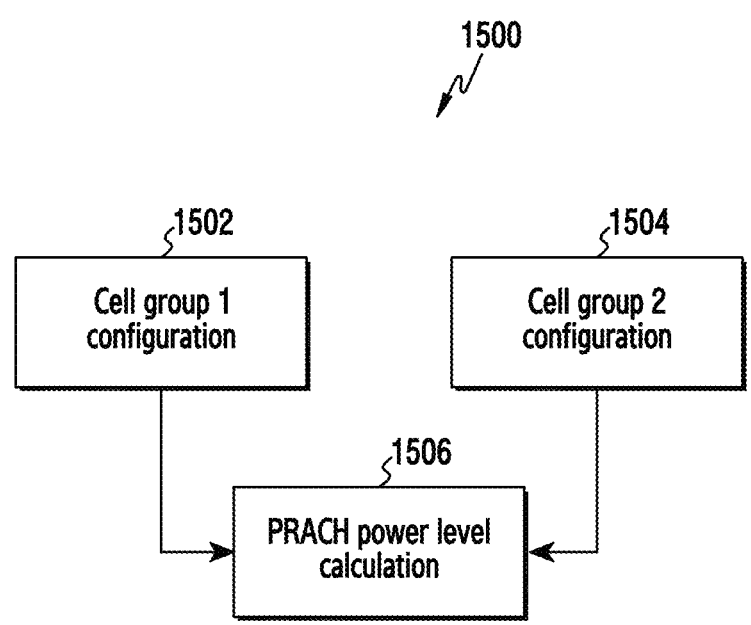
FIG. 15 illustrates a flow diagram various operations for calculating a PRACH power level according to an embodiment as disclosed herein.

FIG. 15 illustrates a flow diagram 1500 illustrating various operations for calculating a PRACH power level according to an embodiment as disclosed herein.

At 1502 and 1504, the method includes obtaining a configuration of one or more cell groups such as cell group1 and cell group2. In one embodiment, the method allows the RACH configuration controller 220 to obtain the configuration of one or more cell group such as cell group1 and cell group2. A configuration of cell group is one or more configuration such as numerology, priority, waveform, beamforming architecture, beam width, preamble size, preamble format and other parameters that may impact the RACH.

For changing priority levels or based on quality of service (QoS), the max value of PREAMBLE_TRANSMISSION_COUNTER can be changed for example a higher value for higher priority and lower value for lower priority level. This priority levels can also be sued to impact the parameters of the Msg3 where the number of repetitions for Msg3 can be variable—a higher number of high priority and lower number for lower priority.

At 1506, the method includes calculating the power level for PRACH resources. In one embodiment, the method allows the RACH configuration controller 220 to calculate the power level for PRACH resources. If the UE 200 transmits SRS on one cell and PRACH on Scell, then the power calculations similar to above can be used for calculating the power levels for PRACH on Scell based on SRS numerology, PRACH numerology for Scell, Pcmax, waveform, beam forming parameters etc. The following equation (4) is used for calculating the power levels to be used for transmissions on cells simultaneously.

$$\Sigma_{c=j} w(i) * \hat{P}_{PUSCH,c}(i) \leq \hat{P}_{cmax}(i) - \hat{P}_{PUSCH,j}(i) \quad (4)$$

In one embodiment, similar formula can be used for calculating the power level for PRACH while also including the impacts of numerology, waveform, beamforming aspects etc.

In one embodiment, as in LTE, If the UE 200 is configured with multiple TAGs then, the UE 200 can, when requested by higher layers, to transmit PRACH in a secondary serving cell in parallel with PUSCH/PUCCH in a different serving cell belonging to a different TAG, adjust the transmission power of PUSCH/PUCCH so that the UE's total transmission power does not exceed Pcmax on the overlapped portion. However, then it may also account for numerology, beams, waveforms for calculating these power limits.

In one embodiment, as in LTE, if the UE 200 is configured with multiple TAGs, the UE 200 can, when requested by higher layers, to transmit PRACH in a secondary serving cell in parallel with SRS transmission in a symbol on a subframe of a different serving cell belonging to a different TAG, drop SRS if the total transmission power exceeds Pcmax on any overlapped portion in the symbol. This dropping may not be needed sometimes when the UE 200 may be asked to sue a different waveform such as DFT-s-OFDM since the back-off needed for this waveform compared to CP-OFDM is close to 3 dB. Hence, the dropping rule may also account for numerology, beams, and waveforms for calculating these limits.

In one embodiment, as in LTE, if a PRACH transmission of the UE 200 on the Pcell starting in subframei1 of MCG overlaps in time domain with another PRACH transmission of the UE 200 starting in subframei2 of SCG, and if subframe i1 and subframe i2 overlap in time with more than one symbol, and if the total power of both the PRACH transmissions would exceed Pcmax (i1, i2), the UE 200 can configured to transmit the PRACH on the Pcell using the preamble transmission power PPRACH as done in LTE. The UE 200 may drop or adjust the power of the PRACH transmission in subframei2 of SCG such that the total power does not exceed Pcmax (i1,i2 where Pcmax (i1,i2) is the linear value configured transmitted power for Dual Connectivity for the subframe pair (i1 i2) as described in LTE specification. If the UE 200 drops the PRACH transmission, the UE 200 sends power ramping suspension indicator to the higher layers. If the UE 200 adjusts the power of PRACH transmission, the UE 200 may send power ramping suspension indicator to the higher layers. The suspension command may again be based on numerology, beams, and waveforms for calculating these limits. Furthermore, the limit Pcmax (i1,i2) can be dependent on the following limit:Pcmax (i1, i2, numerology1, numerology2, waveform 1, waveform 2, bandwidth 1, bandwidth 2, number of beams)

A simple calculation for Pcmax (i1, i2, numerology1, numerology2, waveform 1, waveform 2, bandwidth 1, bandwidth 2, number of beams, . . . ) could be Pcmax (i1, i2) calculated for some reference configuration and then delta offset is added to this value based on each change that is encountered across the cell groups i.e., delta offset-numerology; delta offset-waveform; delta offset-beam width and so on. It can be a linear combination or a weighted linear combination or some function of all these parameters. The same principles can be used for calculation of power levels or priority levels or overlapping rules among others.

In one embodiment, as in LTE, the UE 200 can, when requested by higher layers, to transmit PRACH on subframei1 or subframei1+1 in secondary serving cell in CG1 and/or to transmit PRACH on subframei2+1 in a serving cell in CG2 in parallel with SRS transmission in a symbol on subframe i1 of a different serving cell belonging to a different TAG of CG1, drop SRS in CG1 if the UE's total transmission power across all CGs exceeds Pcmax on any overlapped portion of the symbol. As mentioned the power levels impact can be considered as mentioned earlier while following these rules.

Figure 16:
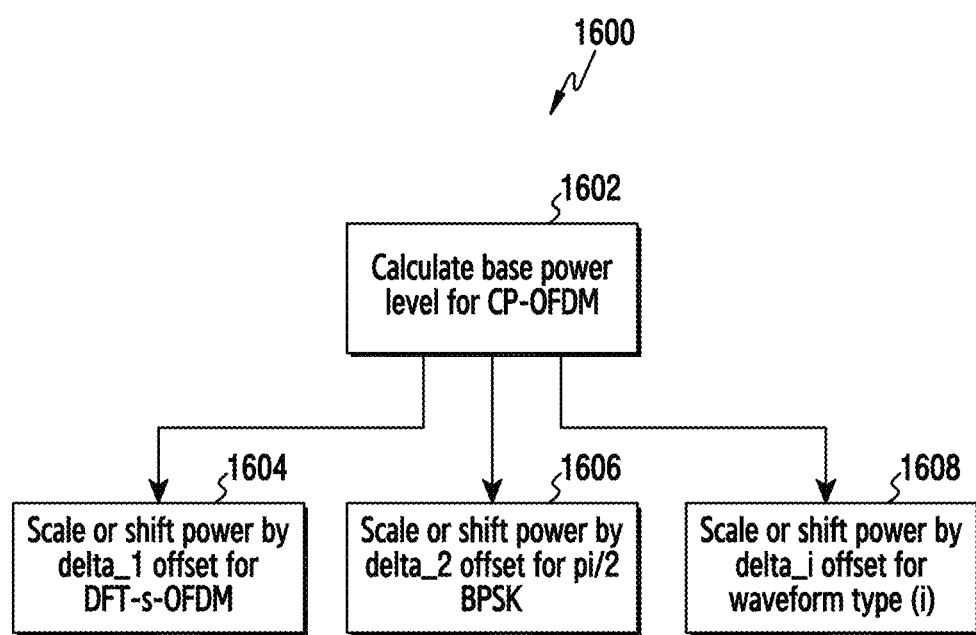
FIG. 16 and FIG. 17 illustrate flow diagrams various operations for controlling the PRACH power level based on a waveform and a numerology according to an embodiment as disclosed herein.
Figure 17:
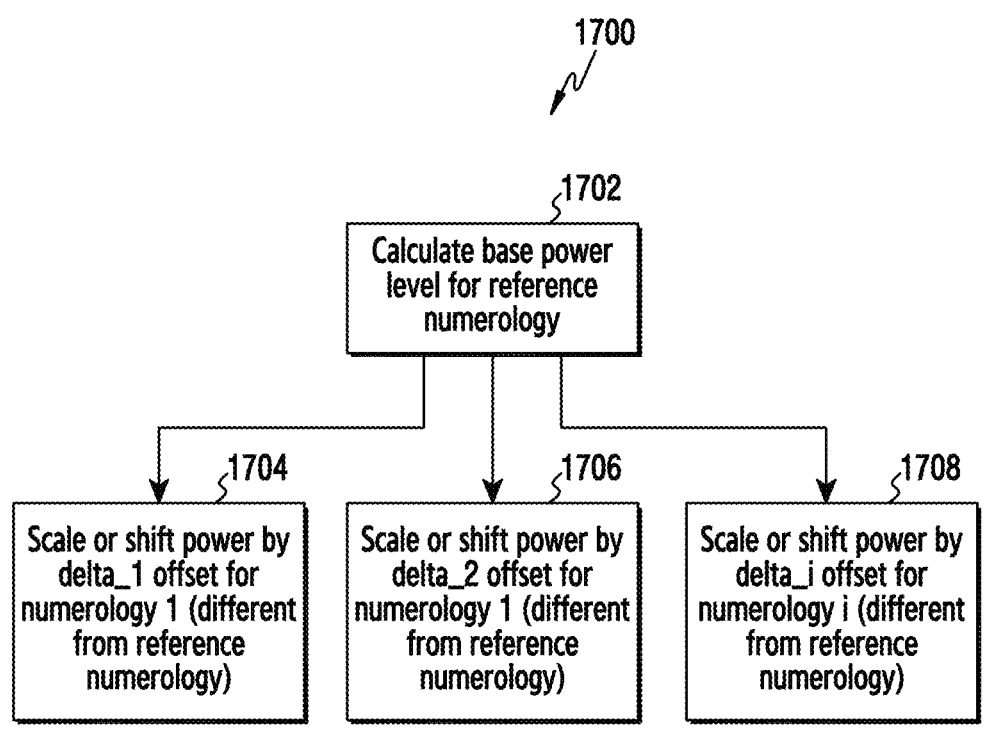

FIG. 16 and FIG. 17 illustrates flow diagrams 1600 and 1700 illustrating various operations for controlling the PRACH power level based on the waveform and the numerology according to an embodiment as disclosed herein.

In the conventional methods and systems, when the UE reaches a maximum random access (RA) transmission counter even before a power ramping reaches maximum power value, the random access procedure is stopped. Further, the UE needs to change a power level or to switch the beam when the RA procedure stops. This results in an unsuccessful RA procedure. Unlike to the conventional methods and systems, the provided method does not change the power level upon reaching maximum power levels. The provided method can be used to scale/shift from a reference power level based on a waveform and a numerology.

In one embodiment, at 1602 and 1702, the UE 200 calculates the base power level for the waveform (e.g., cyclic-prefix orthogonal frequency division multiplexing (CP-OFDM) and a reference numerology. Further, at 1604-1608 and 1704-1708, the UE 200 performs scaling or shifting a power level value by $\Delta_{offset}$ based on the change in the waveform and the numerology. The process of calculating the base power level and scaling or shifting a power level value is described below:

Power ramping: when the UE 200 reaches the maximum RA transmission counter even before the power ramping reaches maximum power value, the RA procedure stops. However, if the power value reaches the maximum with power ramping before the maximum number of RA attempts counter is reached, then the UE 200 can continue sending at the same power level. This behavior is akin to the LTE system. Therefore, in NR, the following values and counters can be maintained similar to LTE-PREAMBLE_TRANSMISSION_COUNTER; preamble TransMax; PCMAX and as in LTE—2 counters can be maintained: (a) power level/power ramping counter; and (b) total RA attempts counter.

However, if needed additional back-off mechanisms may be defined as follows: If the UE 200 reaches maximum power before the total retransmission counter expires, then the UE 200 can back-off power by some pre-defined amounts, so that more power ramping is allowed. This can help reduce some interference to the network. The back-off can be done by the UE 200 implementation or indicated by network based on the network loading.

RACH message 3 power control: The RACH message 3 is sent using the UL-SCH and the necessary parameters for this transmission are obtained from the RAR and higher layers. In LTE, Tx power of msg3 is based on the Tx power of previously transmitted preamble and a parameter "$\Delta_{preamble\_Msg3}$" signalled from system information.

The RACH Message 3 power control is similar to PUSCH power control which is given for LTE as below for subframe is $$P_{PUSCH,c}(i) = \min\{Pcmax,c(i), 10 \log_{10}(M_{PUSCH,c}(i)) + P_{O\_PUSCH,c} + \alpha_c(j)*PL_c + \Delta_{TF,c}(i) + f_c(i)\}[\text{dBm}] \quad (5)$$

where j=2 is used for PUSCH transmissions of the Msg3. Here, $P_{O\_PUSCH} = P_{O_{PRE}} + \Delta_{preamble\_Msg3}$ where $P_{O_{PRE}}$ is preamble Initial Received Target Power. Both preamble Initial Received Target Power (the initial preamble power) and $\Delta_{preamble\_Msg3}$ (the offset between the preamble and Msg3) are given by higher layers. PLc is path loss estimate, $\alpha_c=1$ for PRACH $\Delta_{TF,c}$ depends on the PUSCH resource allocation. For RA, $f_c(0)$ is given by $\Delta P_{rampup} + \delta_{msg2}$ where $\delta_{msg2}$ is the TPC received from the RAR and $\Delta P_{rampup}$ depends on the total power ramp-up requested by higher layers from the first to the last preamble in the serving cell which is obtained from the Msg1 transmission.

$\Delta P_{rampup}$: Power accumulation value for Msg3: irrespective of the UL Tx beam remains same or changes between Msg1 and Msg3, the UE 200 can use the $\Delta b_{rampup}$ as it is. This is because the total value of $\Delta a_{rampup}$ indicates the power level which was needed for the UE's Msg1 to reach to the gNB. Considering the behavior of power ramp-up defined for Msg1 where the power ramping counter doesn't change when the beam switches, similarly the $\Delta n_{rampup}$ may be used without change irrespective of the beam used between Msg1 and Msg3. A similar approach with initial PUSCH transmit power can be applicable for initial PUCCH transmit power calculation after Msg4 and same calculation can be used for gc (i) parameter for PUCCH.

The other options available for this parameter are (a) take value 0 since no information is available (b) scaled or shifted value based on QCL information between the Msg1 beam and Msg3 beam (c) back-off value to be conservative. This shifting value can be indicated in the RAR by the gNB if the shifting value has some information. This may be valid for no beam correspondence cases. For cases with beam correspondence, the same beams may be used and no issue arises. For no beam correspondence cases, the UE 200 uses some related beams as the UE 200 has some knowledge about the relevant beams that the UE 200 can try based on path loss calculations of the SS block for example. The shifting and scaling may depend on the difference between the PL measurements between these beams done during the synchronization phase.

When the UE 200 tries different beams in Msg1, the UE 200 can maintain per beam counter. Then the $\Delta P_{rampup}$ can be used based on the beam the UE 200 was tried and the ramp-up the UE 200 used on each beam. Therefore, the UE 200 maintains $\Delta P_{rampup}$ per beam. A scaled value can be used of the total power ramped as alternative.

PLc Path Loss Parameter: PLc indicates the path loss estimate used. Typically this is calculated based on the beam on which the UE 200 has done SS block measurements. Depending on which Tx-Rx beam pair the UE 200 and the gNB uses for Msg3, the appropriately available path loss value can be used. Here, note that the gNB beam information may not be available with the UE. Hence, it is mentioned as "appropriately available PL measurements".

For instance, this could mean the path loss measurements available from the DL synchronization measurements (as this measurement accounts for the parameters i.e., beam gain and width of gNB DL beam used for SS block and the UE 200 beam used for SS block reception). If any changes in the beam pattern are expected by the gNB, then it may indicate in the RAR message using the $\delta_{msg2}$ variable. If any changes are expected by the UE 200 for the UE's Msg3 beam when compared to the beam used for PL measurements, it may be accounted appropriately at the UE 200 side based on some scaling factors dependent on the UE 200 beam parameters. Some UE 200 side offset such as scaling for beam gain/scaling for beam width may be sued by the UE. If the gNB changes something, then it may indicate via RAR.

In order to account for such changes: (a) The RAR may be used for synchronization measurements, or (b) The RAR indicates the changes in measurements, or (c) The RAR includes some reference signal configurations that can be used for DL measurements. These DL measurements can be used for updating PL calculation for the Msg3 at UE 200 side. In general, the same concept can be used for indicating the gNB side changes—either use RAR to indicate changes at gNB side or use RAR to configure UE 200 to measure new signals for identifying the gNB parameters.

Else, via RMSI the gNB can indicate the gNB's beam parameters. These parameters can be used by the UE 200 to account for path loss measurements. Since the beam gains and beam widths impact this parameter, this is useful information. For connected mode, the gNB may explicitly indicate all these values to the user. The gNB can configure path-loss value to the UE 200 which the gNB has measured using—e.g. SRS or PRACH. For connected mode. RACH this is possible, for initial access PRACH either use some default values or do not bother about the beam parameters. The UE 200 can report in Msg3 the PRACH transmission power (and gNB can configure a path-loss value in Msg4) which can be used for ensuing PUCCH and other transmissions.

As this procedure is still in the initial access phase, the gNB may not be able indicate the UE 200 to use a specific beam and a specific path loss value that is suitable for the gNB-UE Tx Rx beam pair (note that this issue is more prominent in cases for the no beam correspondence cases). The only indication, a gNB may provide, to the UE 200 may be used to indicate to use some alternate beam and not the same beam used for Msg1 if the UE 200 senses high interference in the environment. In such cases, if no measurement is available for the Msg3 beam, then the UE 200 may use $PL_c=0$ in order to avoid interference during Msg3 transmissions. While using PLc=0 may be a conservative choice and may impact the Msg3 transmission and reception at gNB, it is observed that using any other randomly chosen value and causing more interference to the network may be more impactful. PLc may be scaled value based on QCL information available with the UE 200 where in it can interpolate from available measurements. A same mechanism as done in LTE FDD systems to be scaled across frequencies can be done. In LTE FDD DL and UL are on different frequencies. Similarly, when the DL and UL can be on different beams in 5G, the scaling/shifting as done in LTE FDD systems may be used.

One more issue on path loss measurement could be how to calculate PLc. In LTE, PLc is calculated by "reference signal power—higher layer filtered RSRP." Here, reference signal power means the power calculated using downlink reference signals during synchronization phase or during the periodic measurements done when the synchronization signals are available. Since once beam is established, the path loss values may be measured, the provided method can follow same mechanism as in LTE. This may already cover impacts of the beam measurements. The path loss measurements can already cover for the beam specific (beam gain and width) calculations. Hence, it is possible that no more changes are needed if the beams are maintained across various steps of the RACH procedure. However, if for some reason it changes, then some indications are needed. For example, in connected mode, PDCCH uses wide beam and PDSCH uses narrow beam. For such cases either new measurements may be done or be indicated by the gNB to the UE 200 so that the appropriate changes can be taken into account.

The impact of difference in power spectral density between different numerologies can be accounted in the P0, PUSCH values. In NR the number of symbols per slot is 7 or 14. Depending on the number of slots, the Msg3 resource allocation can indicate the UE 200 to use some appropriate scaling offset depending on number of symbols. If the RAR contents do not take care of this based on PUSCH allocation, the UE 200 may interpret the allocation and add an offset by itself dependent on the slot length. This offset can be defined as Poffset, sym_length. It can have values from symbol lengths 1 to 14 which can be pre-defined in specification.

$\Delta_{preamble_{Msg3},offset}$: new offset defined: Since the power level to be used can change based on the beam forming parameters used by the UE 200 and the power level is UE 200 specific, a value $\Delta_{preamble_{Msg3},offset}$ may be defined in the 3GPP specification which depends on (a) beam width, (b) beam gain and other parameters. Further, any dependency on the gNB beam parameters may be indicated in RAR and $\Delta_{preamble_{Msg3},offset}$ only accounts for changes at UE 200 side. If it is found necessary that the numerology and waveform specific power control be introduced in NR, then $\Delta_{preamble_{Msg3},offset}$ may also depend on the specific numerology and/or waveform used for Msg3 transmission. This value may also be indicated by the higher layers. For LTE, there is a different in Msg1 1.25 kHz and Msg3 15 kHz. The existing parameter $\Delta_{preamble_{Msg3}}$ was used to compensate for these differences. In NR, Msg3 numerology is possible to change dynamically based on PRACH and PUCCH multiplexing. Then the Msg3 numerology can change from 15 kHz, to 30 kHz or 60 kHz or 120 or 240 kHz depending on the supported numerologies. In such cases an additional offset parameter may be needed, this value can be just a scaling factor pre-defined in 3GPP specification.

Further, based on numerology indication, the UE 200 can change the power levels appropriately. For example, this can impact based on channel. IN some cases 15 kHz numerology works well because of Doppler scenario and in some cases 30 KHz may work. To compensate for this and for gNB implementation reasons a specific numerology may be used. In such cases, higher power level may be used to compensate for channel impacts.

A similar reasoning can be used for the case of different waveforms. This can be defined in the 3GPP specification, a-priori. For example, some higher power levels can be used in case of DFT-s-OFDM and pi/2 BPSK because the higher power levels have low PAPR. For CP-OFDM some lower power level may be used because of high PAPR. Hence, a reference value may be indicated to the UE 200 based on CP-OFDM. If other waveforms are used, then shifted values can be used as indicated by this offset. In LTE, only DFT-s-OFDM was used in uplink. But in 5G, DFT-s-OFDM, CP-OFDM and pi/2 BPSK waveforms can be used. Hence all these can be accounted for. The waveform to be used can be either implicitly or explicitly indicated. Hence, the UE 200 can choose the scaling value also based on this indication. An example is shown in FIG. 2 and FIG. 3.

In one embodiment, the reference numerology can be one among any several possible waveforms that can be indicated in spec/DCI/MAC CE/RRC/SI. Further, similar figure may be extended for the case of numerology. The reference numerology can be one among several possible numerologies that can be indicated in spec/DCI/MAC CE/RRC/SI. This indication of reference numerology and waveform can be useful for connected mode operations also. The periodicity of indication depends on periodicity of switching and DCI/AC/RRC/SI can be used. A few bits may be included in power headroom report/uplink reports in case UE 200 has to indicate these calculations to the UE 200. This number of bits depends on number of numerologies supported, number of waveforms supported.

$\alpha_c$: Scaling factor: Similar to $\Delta_{preamble_{Msg3},offset}$, the parameter $\alpha_c$ may be configured to change based on the (a) beam width, (b) beam gain and other parameters. If it is found necessary that the numerology and waveform specific power control be introduced in NR, then it can depend on these values as well. The behaviour of this parameter is same as in $\Delta_{preamble_{Msg3},offset}$, either fixed in 3GPP specification or indicated implicitly or explicitly to the UE 200.

Numerology for RACH Procedure is considered. In one embodiment, the numerology for the RACH message 1, the RACH message 2, the RACH message 3 and the RACH message 4 is described herein. The numerology for the RACH message 1 is a sub-carrier spacing used for sending a RA preamble. The numerology may be chosen based on the preamble detection performance under various settings. In such a case, the numerology for RACH message 1 may be indicated via RACH configuration settings which are sent via the RMSI. For example, the numerology for RACH message 2 is indicated in the PBCH/RMSI, the numerology for RACH message 3 is indicated in the PBCH/RMSI/ RACH message 2 and the numerology for RACH message 4 is indicated in the PBCH/RMSI.

In one embodiment, the RACH message 2 is the response sent to the UE 200 for the RACH message 1 transmission. This involves decoding the NR-PDCCH in the common search space (CSS) to decode the RAR contents in the NR-PDSCH. Hence, this involves configuration of the CORESET. The configuration of UE-specific numerology (or UE-group specific numerology) may be associated with a particular service type for the UE 200 or with a UE's speed as this relates to Block Error Rate (BLER) achieved for high (Modulation Coding Scheme) MCS. Such reasons are not applicable for the purposes of the CSS and a single CSS configuration suffices. The numerology used for NR-PDCCH transmissions on the CSS can be the numerology associated with initial access. In some embodiments, the UE 200 needs to receive both NR-PDCCH on the CSS (e.g. for a random access message scheduling) and NR-PDCCH on a UE-DSS with different numerology, prioritization rules can apply (e.g. similar to BL/CE UEs) to limit the UE 200 complexity in case the UE 200 is not capable of multiple FFT filters (e.g. non-CA capable UE) and it can be generally expected that a scheduler can avoid such events.

In one embodiment, having a single CSS also enables a single random access procedure by all UEs 200 and avoids fragmentation of resources (e.g. RA preambles), improves multiplexing capacity (e.g. for UEs 200 that can be addressed by a single RAR message), and reduces overhead associated with having multiple CSS, with potentially multiple configurations indicated in the MIB, and with additional signaling in SIB to indicate CSS configurations according to numerology. A single CSS configuration that follows the same configuration as PBCH is hence better for the NR system operation by avoiding additional signaling to indicate the CORESET for RACH message 2 decoding purposes.

The RAR contents indicate the resources to be used for RACH message 3 transmissions and re-transmissions. This includes a physical resource block (PRB) scheduling for the UL-SCH resources. For a given Bandwidth (BW), the PRB scheduling may change depending on the numerology being used for transmissions. For example, if X PRBs are using 15 kHz subcarrier spacing (SCS), then it is necessary to be indicate as X/2 PRBs are using 30 kHz SCS. It is easy to see that this difference in the SCS may force to use different DCI formats for indicating the PUSCH allocations for RACH message 3. This can also increase: (a) the RAR payload if the numerology has to be included in the RAR; or (b) the blind decoding complexity at the UE 200 side if the numerology is not indicated. Considering this, it seems not necessary to use a separate numerology for RACH message 3 transmissions. In other words, RACH message 3 transmission can be assumed by the UE 200 to be indicated in a default manner, which in this case can be the numerology used in the PBCH transmission.

In one embodiment, the RACH message 4 is the contention resolution step which also delivers the cell-radio network temporary identifier (C-RNTI) to be used by the UE 200 for further communication. This involves NR-PDCCH and NR-PDSCH decoding. The same reasoning as given earlier for RACH message 2 holds true even in the case of scheduling of RACH message 4. There is no reason why RACH message 4 may use a different numerology when compared to the previous RACH procedure steps. Hence, it is preferred that the RACH message 4 follows the numerology of RACH message 2 which is the same numerology used for PBCH transmission.

Explicit mechanisms for numerology indication are considered. In another embodiment, the UE 200 performs a blind decoding for the numerology for RAR/RACH message 2. Then, the UE 200 obtains the numerology to be used for RACH message 3 as indicated in the RAR. Else RAR can follow a default numerology, however, the RAR indicates the numerology for the RACH message 3. Further, for the RACH message 4, the UE 200 can assume same numerology as of RAR/RACH message 2 or the UE 200 can perform another blind decoding. These are the possibilities for numerology configurations for RACH. Each step can indicate the numerology for the other step as well if deemed necessary in RACH for future wireless systems (beyond 5G communication system).

If PBCH indicates the numerology for RMSI, then the UE's PRACH can be followed based on RMSI numerology. Hence, PRACH (RACH Message 2, 3, 4) can use PBCH numerology or RMSI numerology (as indicated by PBCH or defined in 3GPP specification) or defined in specification or indicated as above (via RAR and other steps).

The numerology for Msg3 can impact the power calculations used for Msg3. In LTE, Tx power of msg3 is based on the Tx power of previously transmitted preamble and a parameter "deltaPreambleMsg3" signaled from system information. For NR since the numerology of Msg3 may be changing, the parameter deltaPreambleMsg3 can account for the numerology changes. Also if waveform for Msg3 is variable and not fixed, then this parameter can account for the back off values that are possible based on CP-OFDM and/or DFT-s-OFDM waveform used for the Msg3. Or a parameter may be set in the 3GPP specification as "deltaPreambleMsg3Offset." This offset parameter can be used by the UE 200 itself based on the waveform/numerology/beam forming mechanism the UE 200 is using. Hence, the offset parameter can be defined by:

{
    deltaPreambleMsg3Offset-numerology;
    deltaPreambleMsg3Offset-waveform;
    deltaPreambleMsg3Offset-beamfomring_mechanism;
    deltaPreambleMsg3Offset-beamwidth;
}
or functions of these For LTE, the below table indicates the RAR contents.

TABLE 2

RAR contents

| DCI contents | CE mode A | CE mode B |
|---|---|---|
| Msg 3 PUSCH narrowband index | $N_{NB}^{index}$ | 2 |
| Msg3 PUSCH resource allocation | 4 | 3 |
| Number of repetitions for Msg3 PUSCH | 2 | 3 |
| MCS | 3 | 0 |
| TBS | 0 | 2 |
| TPC | 3 | 0 |
| CSI request | 1 | 0 |
| UL delay | 1 | 0 |
| Msg3/4 MPDCCH narrowband index | 2 | 2 |
| Total Nr-bits | 20 | 12 |

For NR, the RAR contents can include, waveform for Msg3, numerology for Msg3, power offset for the Msg3 based on waveform and/or numerology. The PUSCH resource allocation may need to account for the numerology used. The resource block group (RBG) size may be appropriately scaled. By default, the UE 200 may perform the RBG calculations based on the numerology indicated for the MSg3 in the RAR contents.

A bandwidth part is typically not configured until the UE 200 enters into the connected mode. However, if a network decides to configure the bandwidth part before itself as part of SI, such as narrow band internet of things (NB-IoT)/enhanced machine type communications (eMTC), then the Msg3 narrowband index for transmission is indicated.

TABLE 3

Msg3 PUSCH information for a narrowband index

| Value of Msg3 narrowband index | Msg3 PUSCH narrowband |
|---|---|
| "00" | $(NB_{RAR} + 1) \bmod N_{NB}$ |
| "01" | $(NB_{RAR} + 2) \bmod N_{NB}$ |
| "10" | $(NB_{RAR} + 3) \bmod N_{NB}$ |
| "11" | $(NB_{RAR} + 4) \bmod N_{NB}$ |

$NB_{RAR}$ is the narrow band used for first subframe for Random Access Response and is determined by higher layer if only one narrowband is configured, otherwise, it is determined as described in the 3GPP specification. For NR, bandwidth part is defined akin to narrowband in the eMTC. The above calculation can be used similar for NR but using the concept of BW part. If the numerology is linked to BW part, then the number of bandwidth parts may be changed. The function of numerology and the bandwidth part size can be used for determining the Msg3 resources. A wide bandwidth is divided into bandwidth parts as group of PRBs for ease of allocation and indication.

The gNB may therefore use Msg2 to help the UE 200 with the gNB's beam parameters based values. Other values can be defined in spec/implicit or explicit indication via RAR or via system information (RMSI or PBCH or via other system information). This is behaviour for initial access. For connected mode, DCI signalling and/or RRC signalling can be used by the gNB to help with gNB-UE Tx RX beam specific power management. The beam specific parameters mentioned herein can be indicated to the UE 200 via the RACH configuration so that the gNB can indicate the UE 200 in which parameters may change and account for Msg3.

In some embodiments, a method for operating a base station in a wireless communication system is provided. The method comprises: generating remaining minimum system information (RMSI) comprising random access channel (RACH) configuration, wherein the RACH configuration comprises an association between RACH resources and one of a synchronization Signal (SS) block and channel state information reference signal (CSI-RS) resources; and transmitting, to a user equipment (UE), the RMSI. Preferably, the RACH configuration is broadcasted in the SS blocks used for the RMSI within a cell. Preferably, the RACH configuration is one of a common RACH configuration across all SS blocks, a part of RACH configuration common across all SS blocks, and a different RACH configuration across all SS blocks. Preferably, the RACH configuration in the RMSI indicates a numerology for at least one of RACH message 1, RACH message 2, RACH message 3, and RACH message 4.

Preferably, the association between the RACH resources and the one of the SS block and the CSI-RS resource is based on at least one of a time based mapping and a frequency based mapping. Preferably, a plurality of bits for the RACH configuration in the RMSI is indicated to the UE using at least one of the RMSI, a physical downlink control channel (PDCCH) RMSI and a physical broadcast channel (PBCH). Preferably, the RACH configuration in the RMSI is configured based on a most significant bit (MSB) of the plurality of bits or a least significant bit (LSB) of the plurality of bits. Preferably, a location of a plurality of bits for the RACH configuration in RMSI physical downlink shared channel (PDSCH) is indicated using the RMSI PDCCH to the UE. Preferably, the number of bits is fixed for the RACH configuration.

In some embodiments, a method of managing a random access channel (RACH) configuration in a wireless communication system is provided. The method comprises: configuring by a base station an association between RACH resources and at least one of multiple SS blocks and multiple channel state information reference signal (CSI-RS) resources; and indicating by the base station the association for a handover RACH to a user equipment (UE). Preferably, the association is indicated by a PBCH comprising master information block (MIB) messages and one of a RMSI comprising system information block (SIB) messages and other system information (OSI) comprising system information block (SIB) messages. Preferably, all the MIB messages or SIB messages transmit same information about the association. Preferably, each of the MIB messages or SIB messages transmits different information about the association. Preferably, the association is indicated by equation:
$Idx_{RACH} = ((Idx_{SSblock} - (SFN*M*N_{RACH} + m*N_{RACH}) \% N_{SSblocks}) \% N_{SSblocks})$; $N_{SSblocks}$: (SS blocks transmission per period in slot)*7; M: number of RACH bursts; $N_{RACH}$: number of RACH occasions within a RACH burst; m: 0, . . . M−1; $Idx_{RACH}$: Orthogonal Frequency Division Multiplexing (OFDM) symbol index on where UE transmits RACH; and $Idx_{SSblock}$: estimated SS block index.

Preferably, the RACH resources for the handover RACH are at least one of a resource within a same set of PRACH resources used for initial access RACH resources, fully separated from PRACH resources of initial access RACH resources, and partial overlap with initial access RACH resources. Preferably, a relationship between the CSI-RS resources and the SS blocks is based on a quasi co-location (QCL) relationship between the CSI-RS resource and the SS block resources. Preferably, the association between the RACH resources and the at least one of the multiple SS blocks and the multiple CSI-RS resources is based on the QCL relationship between the CSI-RS resource and the SS block resources.

In some embodiments, a method for operating a user equipment (UE) in a wireless communication system is provided. The method comprises: receiving, from a base station, remaining minimum system information (RMSI) comprising random access channel (RACH) configuration, wherein the RACH configuration comprises an association between RACH resources and one of a SS block and channel state information reference signal (CSI-RS) resources; and performing a random access procedure based on the association. Preferably, the RACH configuration is broadcasted in SS blocks used for the RMSI within a cell. Preferably, the RACH configuration is one of a common RACH configuration across all SS blocks, a part of RACH configuration common across all SS blocks, and a different RACH across all SS blocks. Preferably, the RACH configuration in the RMSI indicates a numerology for at least one of RACH message 1, RACH message 2, RACH message 3, and RACH message 4. Preferably, the association between the RACH resources and the one of the SS block and the CSI-RS resource is based on at least one of a time based mapping and a frequency based mapping. Preferably, the method further comprises: decoding a plurality of bits for the RACH configuration in the RMSI using at least one of the RMSI, a physical downlink control channel (PDCCH) RMSI and a physical broadcast channel (PBCH) from the base station.

Preferably, the method further comprises: decoding the RACH configuration in the RMSI from a MSB of the plurality of bits or a LSB of the plurality of bits. Preferably, the UE decodes a location of a plurality of bits for the RACH configuration in the RMSI PDSCH using the RMSI PDCCH from the base station. Preferably, the plurality of bits is fixed for the RACH configuration.

In some embodiments, a method of managing a random access channel (RACH) configuration in a wireless communication system is provided. The method comprises: receiving by an user equipment (UE) an association between RACH resources and at least one of multiple SS blocks and multiple channel state information reference signal (CSI-RS) resources from a base station; and performing by the UE a random access procedure for a handover RACH based on the association. Preferably, the association is indicated by a PBCH comprising MIB messages and one of a RMSI comprising system information block (SIB) messages and other system information (OSI) comprising a SIB messages. Preferably, all the MIB messages or SIB messages transmit same information about the association. Preferably, each of the MIB messages or SIB messages transmits different information about the association. Preferably, the association is indicated by equation: $Idx_{RACH} = ((Idx_{SSblock} - (SFN*M*N_{RACH}\ m*N_{RACH}) \% N_{SSblocks}) \% N_{SSblocks})$; $N_{SSblocks}$: (SS blocks transmission per period in slot)*7; M: number of RACH bursts; $N_{RACH}$: number of RACH occasions within a RACH burst; m: 0, . . . M−1; $Idx_{RACH}$: orthogonal frequency division multiplexing (OFDM) symbol index on where UE transmits RACH; and $Idx_{SSblock}$: estimated SS block index.

Preferably, the RACH resources for the handover RACH are at least one of a resource within a same set of PRACH resources used for initial access RACH resources, fully separated from PRACH resources of initial access RACH resources, and partial overlap with initial access RACH resources. Preferably, a relationship between the CSI-RS resources and the SS blocks is based on a quasi co-location (QCL) relationship between the CSI-RS resource and the SS block resources. Preferably, the association between the RACH resources and the at least one of the multiple SS blocks and the multiple CSI-RS resources is based on the QCL relationship between the CSI-RS resource and the SS block resources.

In some embodiments, a base station for managing a random access channel (RACH) configuration in a wireless communication system is provided. The base station comprises: a memory; a processor; and a RACH configuration controller coupled with the memory and the processor, configured to: configure remaining minimum system information (RMSI) information comprising the RACH configuration, wherein the RACH configuration comprises an association between RACH resources and one of a SS block and a channel state information reference signal (CSI-RS) resources; and indicate the RMSI to a user equipment (UE). Preferably, the RACH configuration is broadcasted in the SS blocks used for the RMSI within a cell. Preferably, the RACH configuration is one of a common RACH configuration across all SS blocks, a part of RACH configuration common across all SS blocks, and a different RACH configuration across all SS blocks. Preferably, a numerology for at least one of RACH message 1, RACH message 2, RACH message 3, and RACH message 4 is indicated in the RACH configuration in the RMSI.

Preferably, the association between the RACH resources and the one of the SS block and the CSI-RS resource is based on at least one of a time based mapping and a frequency based mapping. Preferably, the RACH configuration controller indicates a plurality of bits for the RACH configuration in the RMSI using at least one of the RMSI, a physical downlink control channel (PDCCH) RMSI and a physical broadcast channel (PBCH) to the UE. Preferably, the RACH configuration controller indicates the RACH configuration in the RMSI from a most significant bit (MSB) of the plurality of bits or from a least significant bit (LSB) of the plurality of bits. Preferably, the RACH configuration controller indicates a location of a plurality of bits for the RACH configuration in RMSI physical downlink shared channel (PDSCH) using the RMSI PDCCH to the UE. Preferably, the plurality of bits is fixed for the RACH configuration.

In some embodiments, a base station for managing a random access channel (RACH) configuration in a wireless communication system is provided. The base station comprises: a memory; a processor; and a RACH configuration controller coupled with the memory and the processor, configured to: configure an association between RACH resources and at least one of multiple SS blocks and multiple channel state information reference signal (CSI-RS) resources; and indicate the association for a handover RACH to a user equipment (UE).

Preferably, the association is indicated by a PBCH comprising MIB messages and one of a RMSI comprising system information block (SIB) messages and other system information (OSI) comprising SIB messages. Preferably, all the MIB messages or SIB messages transmit same information about the association. Preferably, each of the MIB messages or SIB messages transmits different information about the association. Preferably, the association is indicated by equation: $Idx_{RACH} = ((Idx_{SSblock} - (SFN*M*N_{RACH}\ m*N_{RACH}) \% N_{SSblocks}) \% N_{SSblocks})$; $N_{SSblocks}$: (SS blocks transmission per period in slot)*7; M: number of RACH bursts; $N_{RACH}$: number of RACH occasions within a RACH burst; m: 0, . . . M−1; $Idx_{RACH}$: orthogonal frequency division multiplexing (OFDM) symbol index on where UE transmits RACH; and $Idx_{SSblock}$: estimated SS block index.

Preferably, the RACH resources for the handover RACH are at least one of a resource within a same set of PRACH resources used for initial access RACH resources, fully separated from PRACH resources of initial access RACH resources, and partial overlap with initial access RACH resources. Preferably, a relationship between the CSI-RS resources and the SS blocks is based on a quasi co-location (QCL) relationship between the CSI-RS resource and the SS block resources. Preferably, the association between the RACH resources and the at least one of the multiple SS blocks and the multiple CSI-RS resources is based on the QCL relationship between the CSI-RS resource and the SS block resources.

In some embodiments, a user equipment (UE) in a wireless communication system is provided. The apparatus comprises: a transceiver; and at least one processor coupled to the transceiver, and configured to: receive, from a base station, a remaining minimum system information (RMSI) comprising random access channel (RACH) configuration, wherein the RACH configuration comprises an association between RACH resources and one of a SS block and channel state information reference signal (CSI-RS) resources; and perform a random access procedure based on the association. Preferably, the RACH configuration is broadcasted in SS blocks used for the RMSI within a cell.

Preferably, the RACH configuration is one of a common RACH configuration across all SS blocks, a part of RACH configuration common across all SS blocks, and a different RACH across all SS blocks. Preferably, the RACH configuration in the RMSI indicates a numerology for at least one of RACH message 1, RACH message 2, RACH message 3, and RACH message 4. Preferably, the association between the RACH resources and the one of the SS block and the CSI-RS resource is based on at least one of a time based mapping and a frequency based mapping.

Preferably, the number of at least one processor is further configured to: decode a plurality of bits for the RACH configuration in the RMSI using at least one of RMSI, a physical downlink control channel (PDCCH) RMSI and a physical broadcast channel (PBCH) from the base station. Preferably, the UE decodes the RACH configuration in the RMSI from a MSB of the plurality of bits or a LSB of the plurality of bits. Preferably, the UE decodes a location of a plurality of bits for the RACH configuration in the RMSI PDSCH using the RMSI PDCCH from the base station. Preferably, the plurality of bits is fixed for the RACH configuration.

In some embodiments, a UE for managing a random access channel (RACH) configuration in a wireless communication system is provided. The UE comprises: a memory; a processor; and a RACH configuration controller coupled with the memory and the processor, configured to: receive an association between RACH resources and at least one of multiple SS blocks and multiple channel state information reference signal (CSI-RS) resources from a base station; and perform a random access procedure for a handover RACH based on the association. Preferably, the association is indicated by a PBCH comprising MIB messages and one of a RMSI comprising system information block (SIB) messages and OSI comprising SIB messages.

Preferably, all the MIB messages or SIB messages transmit same information about the association. Preferably, each of the MIB messages or SIB messages transmits different information about the association. Preferably, the association is indicated by an equation: $Idx_{RACH} = ((Idx_{SSblock} - (SFN*M*N_{RACH} + m*N_{RACH})) \% N_{SSblocks}) \% N_{SSblocks}$; $N_{SSblocks}$: (SS blocks transmission per period in slot)*7; M: number of RACH bursts; $N_{RACH}$: number of RACH occasions within a RACH burst; m: 0, ... M−1; $Idx_{RACH}$: orthogonal frequency division multiplexing (OFDM) symbol index on where UE transmits RACH; and $Idx_{SSblock}$: estimated SS block index.

Preferably, the RACH resources for the handover RACH are at least one of a resource within a same set of PRACH resources used for initial access RACH resources, fully separated from PRACH resources of initial access RACH resources, and partial overlap with initial access RACH resources. Preferably, a relationship between the CSI-RS resources and the SS blocks is based on a quasi co-location (QCL) relationship between the CSI-RS resource and the SS block resources. Preferably, the association between the RACH resources and the at least one of the multiple SS blocks and the multiple CSI-RS resources is based on the QCL relationship between the CSI-RS resource and the SS block resources.

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a number of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

Although the present disclosure has been described with various embodiments, various changes and modifications may be suggested to one skilled in the art. It is intended that the present disclosure encompass such changes and modifications as fall within the scope of the appended claims.

What is claimed:

1. A method performed by a user equipment (UE), the method comprising:
   receiving one or more synchronization signal (SS) blocks based on one or more beams, wherein each of the one or more SS blocks includes primary synchronization signal (PSS), secondary synchronization signal (SSS), and physical broadcast channel (PBCH), wherein the PBCH indicates information on a first subcarrier spacing for system information;
   receiving the system information based on the first subcarrier spacing, the system information including information on a second subcarrier spacing and random access channel (RACH) configuration, wherein the RACH configuration includes:
      information regarding a number of RACH occasions; and
      information regarding a subset of the RACH occasions associated with each of the one or more SS blocks;
   transmitting a random access preamble of RACH procedure on a RACH occasion based on the second subcarrier spacing and information in the RACH configuration, wherein the RACH occasion is associated with a SS block identified from the one or more SS blocks; and receiving a random access response (RAR) of the RACH procedure based on the first subcarrier spacing.

2. The method of claim 1, further comprising:

transmitting a message 3 of the RACH procedure on resources indicated by the RAR; and receiving a contention resolution message of the RACH procedure on the first subcarrier spacing, according to the message 3 of the RACH procedure.

3. The method of claim 2, wherein the system information includes information on a waveform of the message 3, and wherein the waveform of the message 3 is a cyclic prefix based orthogonal frequency division multiplex (CP-OFDM) or discrete Fourier transform spread OFDM (DFT-s-OFDM).

4. The method of claim 2, wherein the system information includes information on a subcarrier spacing of the message 3.

5. A method performed by a base station (BS), the method comprising:

transmitting one or more synchronization signal (SS) blocks based on one or more beams, wherein each of the one or more SS blocks includes primary synchronization signal (PSS), secondary synchronization signal (SSS), and physical broadcast channel (PBCH), wherein the PBCH indicates information on a first subcarrier spacing for system information;

transmitting the system information based on the first subcarrier spacing, the system information including information on a second subcarrier spacing and random access channel (RACH) configuration, wherein the RACH configuration includes:

information regarding a number of RACH occasions; and information regarding a subset of the RACH occasions associated with each of the one or more SS blocks;

receiving, from a user equipment (UE), a random access preamble of RACH procedure on a RACH occasion based on the second subcarrier spacing and information in the RACH configuration, wherein the RACH occasion is associated with a SS block identified from the one or more SS blocks; and transmitting, to the UE, a random access response (RAR) of the RACH procedure based on the first subcarrier spacing.

6. The method of claim 5, further comprising:

receiving, from the UE, a message 3 of the RACH procedure on resources indicated by the RAR; and transmitting, to the UE, a contention resolution message of the RACH procedure on the first subcarrier spacing, according to the message 3 of the RACH procedure.

7. The method of claim 6, wherein the system information includes information on a waveform of the message 3, and wherein the waveform of the message 3 is a cyclic prefix based orthogonal frequency division multiplex (CP-OFDM) or discrete Fourier transform spread OFDM (DFT-s-OFDM).

8. The method of claim 6, wherein the system information includes information on a subcarrier spacing of the message 3.

9. A user equipment (UE) comprising:

at least one transceiver; and at least one processor operably coupled to the at least one transceiver, configured to:

receive one or more synchronization signal (SS) blocks based on one or more beams, wherein each of the one or more SS blocks includes primary synchronization signal (PSS), secondary synchronization signal (SSS), and physical broadcast channel (PBCH), wherein the PBCH indicates information on a first subcarrier spacing for system information via the at least one transceiver;

receive the system information based on the first subcarrier spacing via the at least one transceiver, the system information including information on a second subcarrier spacing and random access channel (RACH) configuration, wherein the RACH configuration includes:

information regarding a number of RACH occasions; and information regarding a subset of the RACH occasions associated with each of the one or more SS blocks;

transmit a random access preamble of RACH procedure on a RACH occasion based on the second subcarrier spacing and information in the RACH configuration via the at least one transceiver, wherein the RACH occasion is associated with a SS block identified from the one or more SS blocks; and receive a random access response (RAR) of the RACH procedure based on the first subcarrier spacing via the at least one transceiver.

10. The UE of claim 9, wherein the at least one processor is configured to:

transmit a message 3 of the RACH procedure on resources indicated by the RAR via the at least one transceiver; and receive a contention resolution message of the RACH procedure on the first subcarrier spacing via the at least one transceiver, according to the message 3 of the RACH procedure.

11. The UE of claim 10, wherein the system information includes information on a waveform of the message 3, and wherein the waveform of the message 3 is a cyclic prefix based orthogonal frequency division multiplex (CP-OFDM) or discrete Fourier transform spread OFDM (DFT-s-OFDM).

12. The UE of claim 10, wherein the system information includes information on a subcarrier spacing of the message 3.

13. A base station (BS) comprising:

at least one transceiver; and at least one processor operably coupled to the at least one transceiver, configured to:

transmit one or more synchronization signal (SS) blocks based on one or more beams, wherein each of the one or more SS blocks includes primary synchronization signal (PSS), secondary synchronization signal (SSS), and physical broadcast channel (PBCH), wherein the PBCH indicates information on a first subcarrier spacing for system information via the at least one transceiver;

transmit the system information based on the first subcarrier spacing via the at least one transceiver, the system information including information on a second subcarrier spacing and random access channel (RACH) configuration, wherein the RACH configuration includes:
information regarding a number of RACH occasions; and
information regarding a subset of the RACH occasions associated with each of the one or more SS blocks;
receive, from a user equipment (UE), a random access preamble of RACH procedure on a RACH occasion based on the second subcarrier spacing and information in the RACH configuration via the at least one transceiver, wherein the RACH occasion is associated with a SS block identified from the one or more SS blocks; and
transmit, to the UE, a random access response (RAR) of the RACH procedure based on the first subcarrier spacing via the at least one transceiver.

14. The base station of claim 13, wherein the at least one processor is further configured to:

receive, from the UE, a message 3 of the RACH procedure on resources indicated by the RAR via the at least one transceiver; and
transmit, to the UE, a contention resolution message of the RACH procedure on the first subcarrier spacing via the at least one transceiver, according to the message 3 of the RACH procedure.

15. The base station of claim 14,
wherein the system information includes information on a waveform of the message 3, and
wherein the waveform of the message 3 is a cyclic prefix based orthogonal frequency division multiplex (CP-OFDM) or discrete Fourier transform spread OFDM (DFT-s-OFDM).

16. The base station of claim 14, wherein the system information includes information on a subcarrier spacing of the message 3.

* * * * *